United States Patent
Erickson et al.

(10) Patent No.: US 11,582,993 B2
(45) Date of Patent: Feb. 21, 2023

(54) COMPOSITIONS COMPRISING REBAUDIOSIDE J

(71) Applicant: PepsiCo, Inc., Purchase, NY (US)

(72) Inventors: Shawn Erickson, Leonia, NJ (US); Christophe Galopin, Rye Brook, NY (US); Laura Nattress, Tarrytown, NY (US); William Bonorden, Brewster, NY (US)

(73) Assignee: PepsiCo, Inc., Purchase, NY (US)

( * ) Notice: Subject to any disclaimer, the term of this patent is extended or adjusted under 35 U.S.C. 154(b) by 632 days.

(21) Appl. No.: 16/324,439

(22) PCT Filed: Aug. 18, 2017

(86) PCT No.: PCT/US2017/047485
§ 371 (c)(1),
(2) Date: Feb. 8, 2019

(87) PCT Pub. No.: WO2018/044588
PCT Pub. Date: Mar. 8, 2018

(65) Prior Publication Data
US 2019/0174806 A1 Jun. 13, 2019

Related U.S. Application Data

(63) Continuation-in-part of application No. 15/249,816, filed on Aug. 29, 2016, now Pat. No. 10,085,472.

(51) Int. Cl.
*A23L 27/30* (2016.01)
*A23L 2/60* (2006.01)

(52) U.S. Cl.
CPC .................. *A23L 27/33* (2016.08); *A23L 2/60* (2013.01); *A23V 2002/00* (2013.01)

(58) Field of Classification Search
CPC ............. A23L 2/60; A23L 27/33; A23L 27/30
USPC ........................................................ 426/548
See application file for complete search history.

(56) References Cited

U.S. PATENT DOCUMENTS

| | | | |
|---|---|---|---|
| 4,830,862 A | 5/1989 | Braun et al. | |
| 4,925,686 A | 5/1990 | Kastin | |
| 8,877,922 B2 | 11/2014 | Tachdjian et al. | |
| 9,215,889 B2 | 12/2015 | Morita et al. | |
| 2008/0226797 A1* | 9/2008 | Lee | A23L 2/54 426/590 |
| 2011/0183056 A1 | 7/2011 | Morita et al. | |
| 2013/0136838 A1 | 5/2013 | San Miguel et al. | |
| 2014/0093630 A1 | 4/2014 | Shigemura et al. | |
| 2014/0094453 A1 | 4/2014 | Tachdjian et al. | |
| 2014/0187761 A1 | 7/2014 | Morita et al. | |
| 2014/0271996 A1* | 9/2014 | Prakash | A23L 2/52 426/66 |
| 2014/0272068 A1 | 9/2014 | Prakash et al. | |
| 2015/0050410 A1 | 2/2015 | Luo et al. | |
| 2015/0257424 A1 | 9/2015 | Catani et al. | |
| 2016/0039856 A1 | 2/2016 | Prakash et al. | |
| 2016/0198748 A1 | 7/2016 | Prakash et al. | |

FOREIGN PATENT DOCUMENTS

| | | |
|---|---|---|
| WO | WO2007/061900 A1 | 5/2007 |
| WO | WO2007/142680 A1 | 12/2007 |
| WO | WO2008/112852 A1 | 9/2008 |
| WO | WO2008/112975 A2 | 9/2008 |
| WO | WO-2014/186250 A1 | 11/2014 |
| WO | WO 2016-028899 A1 | 2/2016 |
| WO | WO 2016/040577 A1 | 3/2016 |
| WO | WO 2016-130609 A1 | 8/2016 |
| WO | WO-2017/106577 A1 | 6/2017 |

OTHER PUBLICATIONS

Venkata Sai Prakash Chaturvedula and Indra Prakash, "*A New Diterpene Glycoside from Stevia rebaudiana,*" Molecules 2011, 16, 2937-2943; doi:10.3390/molecules16042937, 7 pages.

* cited by examiner

*Primary Examiner* — Erik Kashnikow
*Assistant Examiner* — Bhaskar Mukhopadhyay
(74) *Attorney, Agent, or Firm* — Sterne, Kessler, Goldstein & Fox P.L.L.C.

(57) ABSTRACT

The present disclosure provides high purity rebaudioside J and methods of making high purity rebaudioside J. The application also provides the use of rebaudioside J as a sweetener, and in particular, the use in beverages.

2 Claims, 13 Drawing Sheets

Rebaudioside J

COMPOSITIONS COMPRISING REBAUDIOSIDE J

FIELD OF DISCLOSURE

The present application relates to high purity rebaudioside J and methods of making high purity rebaudioside J. The application also relates to the use of rebaudioside J as a sweetener, and in particular, as a sweetener in beverages.

BACKGROUND

Naturally occurring steviol glycosides are sweet-tasting compounds that can be extracted from the *stevia* plant. Typical *stevia* plant extract includes, in varying amounts, stevioside, steviolbioside, rebaudioside A, rebaudioside B, rebaudioside C, rebaudioside D, rebaudioside E, and dulcoside A. Many of these steviol glycosides are potent, non-nutritive sweeteners and have been used by themselves or in combination with other steviol glycosides as sweeteners.

The food and beverage industry has been attempting to use steviol glycosides for sweetening foods and beverages because these compounds are natural, have a sweetness and flavor profile approaching that of sucrose, and have zero calories. But replacing nutritive sweeteners such as sucrose and high-fructose corn syrup with one or more steviol glycosides has been challenging. While non-nutritive sweeteners such as steviol glycosides offer sweetness and flavor profiles approaching those of their nutritive counterparts, most steviol glycosides do not fully replicate the taste of sugar and suffer from one or more of slow on-set or off-tastes including, for example, bitter, licorice, or lingering aftertastes.

Although some manufacturers have attempted to minimize undesired tastes using a specific steviol glycoside or by blending known steviol glycosides, food and beverage formulations having suitable flavor profiles broadly accepted by consumers have so far not been prepared.

SUMMARY

The present application relates to high purity rebaudioside J and methods for making high purity rebaudioside J. Also disclosed are concentrates, syrups, and beverages comprising high purity rebaudioside J. The application also relates to rebaudioside J blends with additional sweeteners.

In some embodiments, the present disclosure provides isolated rebaudioside J having a purity greater than about 85 weight percent, greater than about 90 weight percent, greater than about 95 weight percent, greater than about 99 weight percent, or greater than about 99.9 weight percent.

In some embodiments, the present disclosure provides a sweetener composition comprising rebaudioside J, wherein the rebaudioside J comprises at least 5 weight percent, at least 50 weight percent, or at least 90 weight percent of the sweetener composition.

In some embodiments, the sweetener composition further comprises a non-nutritive sweetener other than rebaudioside J.

In some embodiments, the non-nutritive sweetener other than rebaudioside J can be selected from the group consisting of Lo Han Guo, stevioside, steviolbioside, rubusoside, dulcoside A, rebaudioside A, rebaudioside B, rebaudioside C, rebaudioside D, rebaudioside E, rebaudioside F, rebaudioside G, rebaudioside H, rebaudioside I, rebaudioside K, rebaudioside L, rebaudioside M, rebaudioside O, acesulfame-K, aspartame, neotame, saccharin, sucralose, and combinations thereof. In some embodiments, the non-nutritive sweetener can be selected from the group consisting of rebaudioside A, rebaudioside B, rebaudioside D, rebaudioside M, and combinations thereof.

In some embodiments, the sweetener composition comprises at least one component selected from the group consisting of flavoring agents, flowing agents, coloring agents, bulking agents, sugar alcohols, rare sugars, anti-caking agents, functional ingredients, and combinations thereof.

In some embodiments, the rebaudioside J can be present in an amount effective to provide a sweetness greater than or equal to about 10% sucrose in the sweetener compositions disclosed herein.

In some embodiments, the present disclosure provides a food product comprising a sweetening amount of rebaudioside J and at least one other food ingredient. In some embodiments, the food product can be a noncarbonated beverage, a carbonated beverage, a frozen beverage, or a dairy beverage.

In some embodiments, the present disclosure provides a beverage product comprising from about 1 ppm to about 10,000 ppm rebaudioside J and water.

In some embodiments, the beverage can be a coffee drink, a cola drink, a tea drink, a juice drink, a dairy drink, a sports drink, an energy drink, or a flavored water drink.

In some embodiments, the rebaudioside J can be present in an amount greater than the taste recognition threshold concentration of rebaudioside J in the beverage products disclosed herein. In some embodiments, the rebaudioside J can be present at a concentration of from about 50 ppm to about 750 ppm.

In some embodiments, the beverage product further comprises at least one additional sweetener, wherein the at least one additional sweetener can be a nutritive sweetener, non-nutritive sweetener other than rebaudioside J, or a combination thereof.

In some embodiments, the at least one additional sweetener can be a non-nutritive sweetener and can be selected from the group consisting of rebaudioside A, rebaudioside B, rebaudioside D, rebaudioside M, and combinations thereof. In some embodiments, the at least one additional sweetener can be rebaudioside B, rebaudioside D, or a combination thereof.

In one embodiment, the at least one additional sweetener can be rebaudioside D, and the rebaudioside D can be present in a concentration of from about 50 ppm to about 750 ppm. In another embodiment, the at least one additional sweetener can be rebaudioside B, and the rebaudioside B can be present in a concentration of from about 50 ppm to about 750 ppm.

In some embodiments, the present disclosure provides a method for preparing rebaudioside J, the method comprising subjecting a compound of Formula II

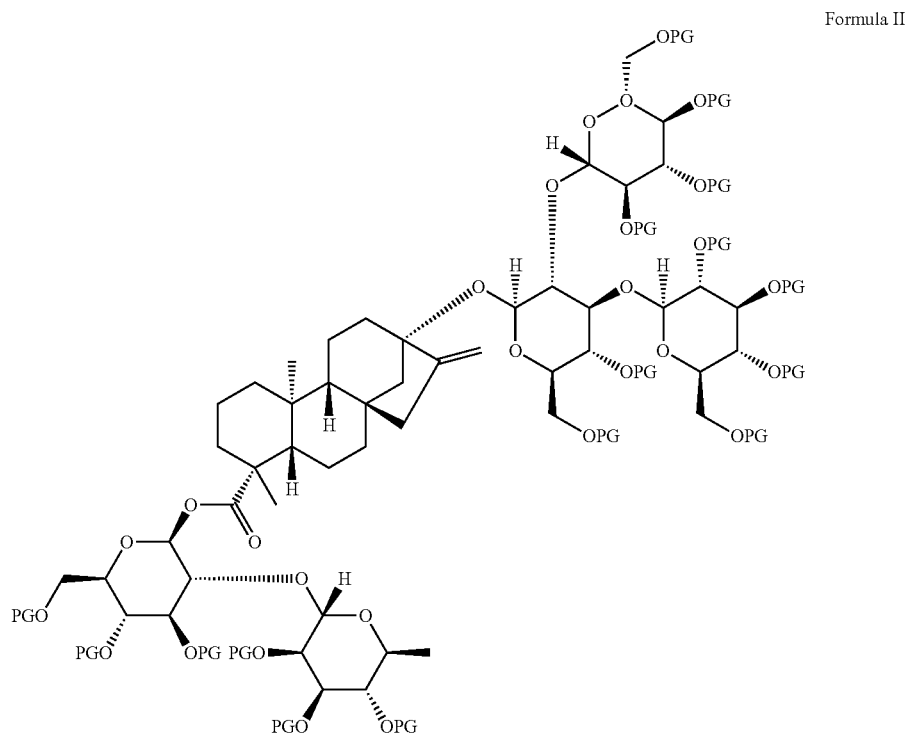

Formula II to deprotection conditions to form rebaudioside J, wherein PG in Formula II can be a protecting group.

In some embodiments, the compound of Formula II can be prepared by reacting a compound of Formula III

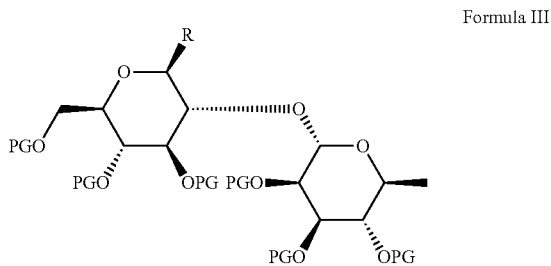

Formula III with a protected rebaudioside B in the presence of a phase transfer catalyst, wherein R in Formula III can be a leaving group.

In some embodiments, the present disclosure provides a beverage comprising a sweetener, from about 1 ppm to less than about 40 ppm rebaudioside J, and water.

In some embodiments, the beverage can be a coffee drink, a cola drink, a tea drink, a juice drink, a dairy drink, a sports drink, an energy drink, or a flavored water drink.

In some embodiments, the sweetener can be a nutritive sweetener, non-nutritive sweetener other than rebaudioside J, or a combination thereof. In some embodiments, the sweetener can be a non-nutritive sweetener selected from the group consisting of rebaudioside A, rebaudioside B, rebaudioside D, rebaudioside M, SG95, acesulfame-K, sucralose, aspartame, mogroside V, and combinations thereof. In some embodiments, the sweetener can be rebaudioside A.

In some embodiments, rebaudioside A can be present in the beverage in a concentration of from about 50 ppm to about 750 ppm.

In some embodiments, the sweetener can be high fructose corn syrup or sucrose.

In some embodiments, the disclosure provides a method of modifying a sensorial attribute of a sweetener in a food product, the method comprising, adding rebaudioside J to the food product in an amount sufficient to achieve a modifying concentration of rebaudioside J in the food product.

In some embodiments, the sweetener can be a non-nutritive sweetener selected from the group consisting of rebaudioside A, rebaudioside B, rebaudioside D, rebaudioside M, SG95, acesulfame-K, sucralose, aspartame, mogroside V, and combinations thereof. In some embodiments, the sweetener can be rebaudioside A.

In some embodiments, rebaudioside A can be present in the food product at a concentration ranging from about 50 ppm to about 750 ppm.

In some embodiments, the sweetener can be high fructose corn syrup or sucrose.

In some embodiments, the sensorial attribute being modified can be overall sweetness, sweetness onset delay, sweetness linger, bitterness, astringency, metallic taste, licorice off-notes, roundness, or any combination thereof.

In some embodiments, the modifying concentration of rebaudioside J can be from about 1 ppm to less than about 40 ppm.

BRIEF DESCRIPTION OF THE DRAWINGS

The foregoing summary, as well as the following detailed description of the embodiments, will be better understood when read in conjunction with the appended figures. For the purpose of illustration, the figures may describe the use of specific embodiments. It should be understood, however, that the compositions described herein are not limited to the precise embodiments discussed or described in the figures.

DETAILED DESCRIPTION

Figure 1:
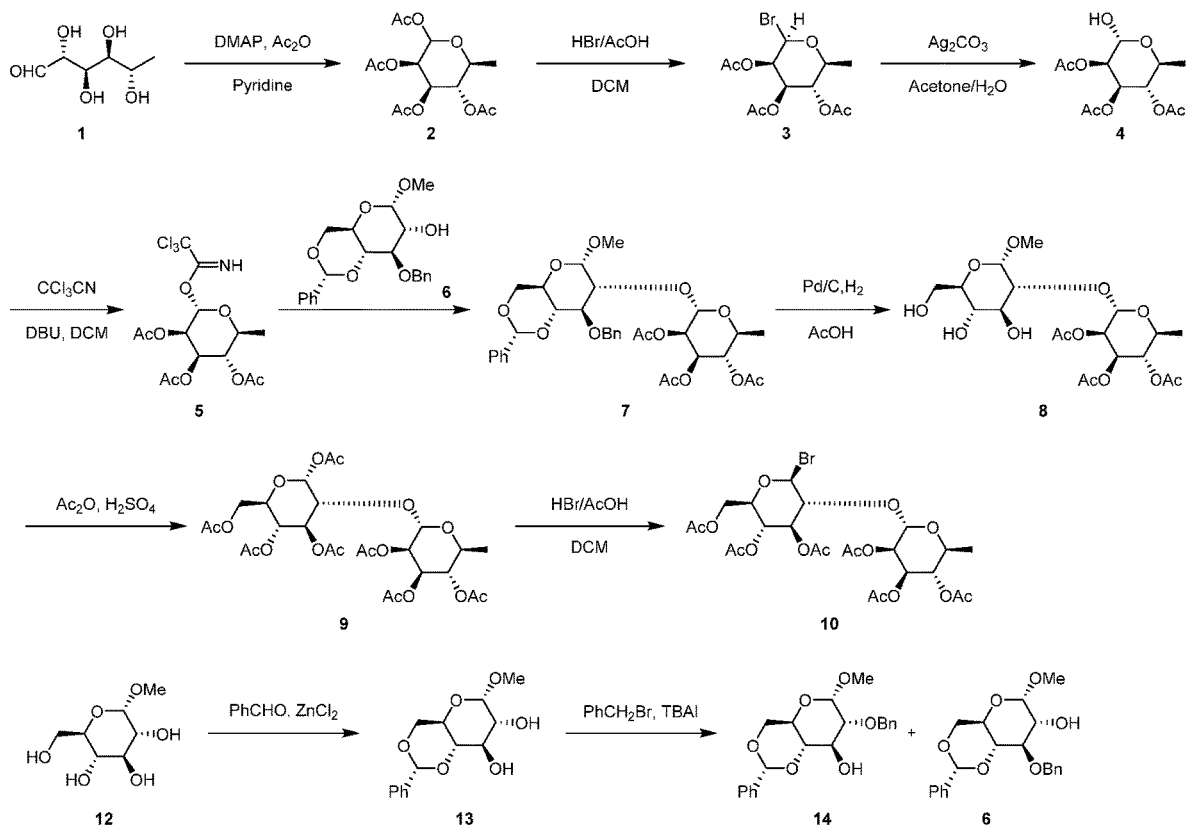
FIG. 1 depicts a synthetic scheme for synthesizing (2S,3R,4R,5S,6S)-2-(((2S,3R,4S,5R,6R)-4,5-diacetoxy-6-(acetoxymethyl)-2-bromotetrahydro-2H-pyran-3-yl)oxy)-6-methyltetrahydro-2H-pyran-3,4,5-triyl triacetate (Compound 10).

Various examples and embodiments of the inventive subject matter disclosed here are possible and will be apparent to a person of ordinary skill in the art, given the benefit of this disclosure. In this disclosure reference to "some embodiments," "certain embodiments," "certain exemplary embodiments" and similar phrases each means that those embodiments are non-limiting examples of the inventive subject matter, and there are alternative embodiments which are not excluded.

The articles "a," "an," and "the" are used herein to refer to one or more than one (i.e., to at least one) of the grammatical objects of the article. By way of example, "an element" means one element or more than one element.

The word "comprising" is used in a manner consistent with its open-ended meaning, that is, to mean that a given product or process can optionally also have additional features or elements beyond those expressly described. It is understood that wherever embodiments are described with the language "comprising," otherwise analogous embodiments described in terms of "consisting of" and/or "consisting essentially of" are also contemplated and within the scope of this disclosure.

As used herein, the term "about" means ±10% of the noted value. By way of example only, a composition comprising "about 30 weight percent" of a compound could include from 27 weight percent of the compound up to and including 33 weight percent of the compound.

The terms "beverage concentrate," "concentrate," and "syrup" are used interchangeably throughout this disclosure and refer to an aqueous sweetener composition suitable for use in beverage preparation. Exemplary embodiments are described elsewhere in this disclosure.

As used herein, the term "Brix" means the sugar content of an aqueous solution (w/w). By way of example only, a solution that is 1 degree Brix contains 1 g of sucrose in 100 g of the solution, while a solution that is 5 degrees Brix contains 5 g sucrose in 100 g of the solution.

As used herein, a "sweetening amount" of a sweetener refers to the sweetener being present in an amount sufficient to contribute sweetness perceptible in a food product to a sensory panel. That is, as used here the term a "sweetening amount" means an amount or concentration that in the formulation of the food product in question causes sweetening that is perceptible to at least a majority of an expert sensory panel of the type commonly used in the food industry for making assessments of the taste attributes of a beverage or other food.

The term "sweetness recognition threshold concentration," as generally used herein, is the lowest known concentration of a given sweetener or combination of sweeteners recognized as sweet by the human sense of taste, typically about 1.5% sucrose equivalence. Rebaudioside J in a concentration of 40 ppm is less sweet than 1.5% sucrose.

As used herein, "taste" refers to a combination of sweetness perception, temporal effects of sweetness perception, i.e., on-set and duration, off-tastes, e.g. bitterness and metallic taste, residual perception (aftertaste), and tactile perception, e.g. body and thickness.

The term "nutritive sweetener" refers generally to sweeteners which provide significant caloric content in typical usage amounts, e.g., more than about 5 calories per 8 oz. serving of a beverage.

As used herein, the term "non-nutritive sweetener" refers to all sweeteners other than nutritive sweeteners.

As used herein, a "low-calorie beverage" has less than 40 calories per 8 oz. serving of a given beverage.

As used herein, "zero-calorie" means having less than 5 calories per 8 oz. serving of a given beverage.

As used herein, a "potent sweetener" means a sweetener which is at least twice as sweet as sugar, i.e. a sweetener which on a weight basis requires no more than half the weight of sugar to achieve an equivalent sweetness. For example, a potent sweetener may require less than one-half the weight of sugar to achieve an equivalent sweetness in a beverage sweetened to a level of 10 degrees Brix with sugar. Potent sweeteners can be either nutritive or non-nutritive sweeteners and can be natural (e.g., steviol glycosides, Lo Han Guo, etc.) or artificial (e.g., neotame, etc.).

The term "enantiomeric excess" or "ee" refers to a measure for how much of one enantiomer is present compared to the other. For a mixture of R and S enantiomers, the percent enantiomeric excess is defined as |R−S|*100, where R and S are the respective mole or weight fractions of enantiomers in a mixture such that R+S=1. With knowledge of the optical rotation of a chiral substance, the percent enantiomeric excess is defined as $([\alpha]_{obs}/[\alpha]_{max})*100$, where $[\alpha]_{obs}$ is the optical rotation of the mixture of enantiomers and $[\alpha]_{max}$ is the optical rotation of the pure enantiomer.

The term "diastereomeric excess" or "de" refers to a measure for how much of one diastereomer is present compared to the other and is defined by analogy to enantiomeric excess. Thus, for a mixture of diastereomers, D1 and D2, the percent diastereomeric excess is defined as |D1−D2|*100, where D1 and D2 are the respective mole or weight fractions of diastereomers in a mixture such that D1+D2=1.

The determination of diastereomeric and/or enantiomeric excess is possible using a variety of analytical techniques, including NMR spectroscopy, chiral column chromatography, and/or optical polarimetry according to routine protocols familiar to those of ordinary skill in the art.

As used herein, unless otherwise specified, the term "added," "combined," and terms of similar character mean that the ingredients or components referred to (e.g., one or more sweeteners, sweetness enhancers, etc.) are combined in any manner and in any order, with or without stirring.

Rebaudioside J has the structure of Formula I:

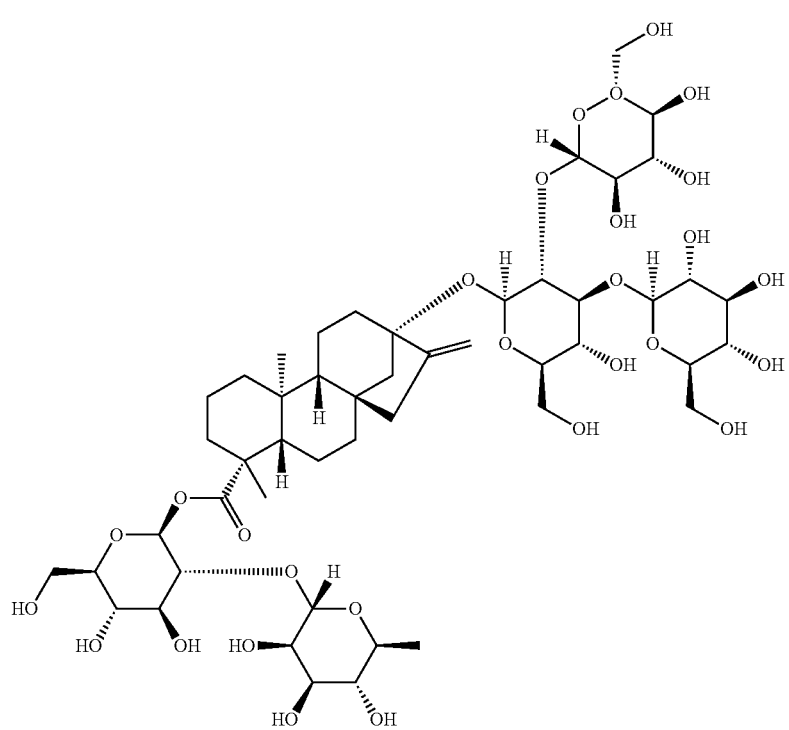

Formula I

The present disclosure provides isolated rebaudioside J. In some embodiments, the rebaudioside J can be prepared by the synthesis described herein. In other embodiments, the rebaudioside J can be isolated from *Stevia rebaudiana* extract.

Regardless of how it is prepared and/or isolated, the rebaudioside J described herein can be a substantially purified compound, for example, having a purity of at least 80%, at least 85%, at least 90%, at least 95%, at least 99%, or at least 99.9% by weight. In some embodiments, the isolated rebaudioside J can be a substantially purified compound having a purity of at least 80%, at least 85%, at least 90%, at least 95%, at least 99%, or at least 99.9% by HPLC measurement, for example, using the method described in the Examples section. In some embodiments, the isolated rebaudioside J can be a substantially purified compound having a purity by weight of about 80%, about 85%, about 90%, about 95%, about 99%, about 99.9% or any ranges between the specified values. In some embodiments, the compound can be a substantially purified compound having a purity by HPLC measurement of about 80%, about 85%, about 90%, about 95%, about 99%, about 99.9%, or any ranges between the specified values.

In some embodiments, the isolated rebaudioside J can be enantiomerically pure, for example, having an enantiomeric excess of at least 50%, at least 55%, at least 60%, at least 65%, at least 70%, at least 75%, at least 80%, at least 85%, at least 90%, at least 91%, at least 92%, at least 93%, at least 94%, at least 95%, at least 96%, at least 97%, at least 98%, at least 99%, at least 99.9%, essentially 100%, or any ranges between the specified values.

In some embodiments, the isolated rebaudioside J can be diastereomerically pure, for example, having a diastereomeric excess of at least 50%, at least 55%, at least 60%, at least 65%, at least 70%, at least 75%, at least 80%, at least 85%, at least 90%, at least 91%, at least 92%, at least 93%, at least 94%, at least 95%, at least 96%, at least 97%, at least 98%, at least 99%, at least 99.9%, essentially 100%, or any ranges between the specified values.

Sweetener Composition Comprising Rebaudioside J

Rebaudioside J is a high potency sweetener with a good sweetness profile. Rebaudioside J can be used as a sweetener directly or can be used in a sweetener composition.

In some embodiments, the present disclosure provides a sweetener composition comprising rebaudioside J in a concentration above its sweetness recognition threshold concentration. In some embodiments, rebaudioside J, in any of the varying purities described above, can be the only sweetener present in the sweetener composition.

In some embodiments, the sweetener composition further comprises a second sweetener. The second sweetener can be a nutritive or non-nutritive, natural or synthetic sweetener, or a combination of such sweeteners, so long as the second sweetener or combination of sweeteners provides a taste which can be perceived as sweet by the sense of taste. The perception of flavoring agents and sweetening agents can depend to some extent on the interrelation of elements. Flavor and sweetness can also be perceived separately, i.e., flavor and sweetness perception can be both dependent upon each other and independent of each other. For example, when a large amount of a flavoring agent can be used, a small amount of a sweetening agent can be readily perceptible and vice versa. Thus, the oral and olfactory interaction between a flavoring agent and a sweetening agent can involve the interrelationship of elements. In some embodiments, the second sweetener can be a nutritive sweetener. In some embodiments, the second sweetener can be a non-nutritive sweetener. In some embodiments, the second sweetener can be a natural sweetener. In some embodiments, the second sweetener can be an artificial sweetener.

When used to sweeten, the second sweetener can be present in an amount above the sweeteners' sweetness recognition threshold concentration.

In certain embodiments, the second sweetener can comprise one or more nutritive sweeteners in an amount of from about 1% to about 20% by weight of the sweetener composition, such as from about 3% to about 16% by weight, or from about 5% to about 12% by weight, depending upon the desired level of sweetness in the sweetener composition.

Exemplary natural nutritive sweeteners suitable for use as a second sweetener include crystalline or liquid sucrose, fructose, glucose, dextrose, maltose, trehalose, fructo-oligosaccharides, glucose-fructose syrup from natural sources such as apple, chicory, and honey; high fructose corn syrup, invert sugar, maple syrup, maple sugar, honey, brown sugar molasses, cane molasses, such as first molasses, second molasses, blackstrap molasses, and sugar beet molasses; sorghum syrup, and combinations thereof. In certain embodiments, the one or more nutritive sweeteners can be glucose, high-fructose corn syrup, or a combination thereof.

In some embodiments, the second sweetener can comprise one or more sugar alcohols such as erythritol, sorbitol, mannitol, xylitol, lactitol, isomalt, malitol, tagatose, trehalose, galactose, rhamnose, cyclodextrin, ribulose, threose, arabinose, xylose, lyxose, allose, altrose, mannose, idose, lactose, maltose, isotrehalose, neotrehalose, palatinose or isomaltulose, erythrose, deoxyribose, gulose, talose, erythrulose, xylulose, psicose, turanose, cellobiose, glucosamine, mannosamine, fucose, fuculose, glucuronic acid, gluconic acid, glucono-lactone, abequose, galactosamine, xylo-oligosaccharides (xylotriose, xylobiose and the like), gentio-oligoscaccharides (gentiobiose, gentiotriose, gentiotetraose and the like), galacto-oligosaccharides, sorbose, ketotriose (dehydroxyacetone), aldotriose (glyceraldehyde), nigero-oligosaccharides, fructooligosaccharides (kestose, nystose and the like), maltotetraose, maltotriol, tetrasaccharides, mannan-oligosaccharides, malto-oligosaccharides (maltotriose, maltotetraose, maltopentaose, maltohexaose, maltoheptaose and the like), dextrins, lactulose, melibiose, raffinose, rhamnose, ribose, and combinations thereof.

In still further embodiments, the second sweetener can comprise one or more rare sugars such as D-allose, D-psicose (also known as D-allulose), L-ribose, D-tagatose, L-glucose, L-fucose, L-arabinose, D-turanose, D-leucrose, and combinations thereof.

In certain embodiments, the second sweetener can comprise one or more artificial sweeteners. Exemplary artificial sweeteners suitable for use as a second sweetener herein include, but are not limited to, saccharin, cyclamate, aspartame, neotame, advantame, acesulfame-K, sucralose, combinations thereof.

In certain embodiments, the second sweetener can comprise one or more non-nutritive sweeteners other than Rebaudioside J. In certain embodiments, rebaudioside J and the second sweetener comprising one or more non-nutritive sweeteners other than rebaudioside J can be present at a ratio of from about 99:1 to about 1:99. Alternatively, in some embodiments, the second sweetener comprising one or more non-nutritive sweeteners other than rebaudioside J can be present in an amount ranging from about 1 ppm to about 600 ppm in the sweetener composition, depending upon the particular non-nutritive sweetener(s) being used and the desired level of sweetness in the sweetener composition.

In some embodiments, the non-nutritive sweetener other than rebaudioside J can be selected from the group consisting of Lo Han Guo, stevioside, steviolbioside, rubusoside, dulcoside A, rebaudioside A, rebaudioside B, rebaudioside C, rebaudioside D, rebaudioside E, rebaudioside F, rebaudioside G, rebaudioside H, rebaudioside I, rebaudioside K, rebaudioside L, rebaudioside M, rebaudioside O, acesulfame-K, aspartame, neotame, saccharin, sucralose, neohespiridin dihydrochalcone, glycyrrhizin and derivatives and salts thereof, and combinations thereof. In some embodiments, the non-nutritive sweetener can be selected from the group consisting of rebaudioside A, rebaudioside B, rebaudioside D, rebaudioside M, and combinations thereof.

In certain exemplary embodiments, the sweetener composition comprises rebaudioside A and rebaudioside J. In certain exemplary embodiments, the sweetener composition comprises rebaudioside B and rebaudioside J. In certain exemplary embodiments, the sweetener composition comprises rebaudioside D and rebaudioside J. In certain exemplary embodiments, the sweetener composition comprises rebaudioside M and rebaudioside J. In certain exemplary embodiments, the sweetener composition comprises rebaudioside B, rebaudioside D, and rebaudioside J. In certain exemplary embodiments, the sweetener composition comprises rebaudioside A, rebaudioside B, and rebaudioside J.

In some embodiments, the sweetener composition comprises rebaudioside J and rebaudioside A, and the weight ratio of rebaudioside J to rebaudioside A can be about 10:1, about 9:1, about 8:1, about 7:1, about 6:1, about 5:1, about 4:1, about 3:1, about 2:1, about 1:1, about 1:2, about 1:3, about 1:4, about 1:5, about 1:6, about 1:7, about 1:8, about 1:9, about 1:10, or any ranges between the specified values. In other embodiments, rebaudioside J and rebaudioside A can be present in the sweetener composition in a ratio of about 99:1, about 75:1, about 50:1, about 25:1, about 20:1, about 15:1, about 10:1, about 5:1, about 1:1, about 1:5, about 1:10, about 1:15, about 1:20, about 1:25, about 1:50, about 1:75, about 1:99, or any ranges between the specified values.

In some embodiments, the sweetener composition comprises rebaudioside J and rebaudioside B, and the weight ratio of rebaudioside J to rebaudioside B can be about 99:1, about 75:1, about 50:1, about 25:1, about 20:1, about 15:1, about 10:1, about 9:1, about 8:1, about 7:1, about 6:1, about 5:1, about 4.5:1, about 4:1, about 3.5:1, about 3:1, about 2.5:1, about 2:1, about 1.5:1, about 1:1, about 1:5, about 1:10, about 1:15, about 1:20, about 1:25, about 1:50, about 1:75, about 1:99, or any ranges between the specified values. In some embodiments, the weight ratio of rebaudioside J to rebaudioside B can be 5:1.

In some embodiments, the sweetener composition comprises rebaudioside J and rebaudioside D, and the weight ratio of rebaudioside J to rebaudioside D can be about 99:1, about 75:1, about 50:1, about 25:1, about 20:1, about 15:1, about 10:1, about 9:1, about 8:1, about 7:1, about 6:1, about 5:1, about 4.5:1, about 4:1, about 3.5:1, about 3:1, about 2.5:1, about 2:1, about 1.5:1, about 1:1, about 1:5, about 1:10, about 1:15, about 1:20, about 1:25, about 1:50, about 1:75, about 1:99, or any ranges between the specified values. In some embodiments, the weight ratio of rebaudioside J to rebaudioside D can be 5:1.

In some embodiments, the sweetener composition comprises rebaudioside J, rebaudioside B, and rebaudioside D, and the weight ratio of rebaudioside J:rebaudioside B:rebaudioside D can be about 7:2:1.

In some embodiments, the sweetener composition comprises rebaudioside J, rebaudioside B, and rebaudioside A, and the weight ratio of rebaudioside J:rebaudioside B:rebaudioside A can be about 1:3:16.

In certain embodiments, rebaudioside J comprises at least 5%, at least 10%, at least 10%, at least 20%, at least 30%, at least 40%, at least 50%, at least 60%, at least 70%, at least 80%, at least 90%, or at least 95% of the sweetener composition.

In some embodiments, the sweetener composition comprises rebaudioside J in an amount effective to provide a sweetness greater than or equal to about 10% sucrose.

In some embodiments, the sweetener composition comprises from about 1 ppm to about 10,000 ppm rebaudioside J. In some embodiments, the sweetener composition comprises about 1 ppm, about 5 ppm, about 10 ppm, about 50 ppm, about 100 ppm, about 200 ppm, about 300 ppm, about 400 ppm, about 500 ppm, about 600 ppm, about 700 ppm, about 800 ppm, about 900 ppm, about 1000 ppm, about 2000 ppm, about 3000 ppm, about 4000 ppm, about 5000 ppm, about 6000 ppm, about 7000 ppm, about 8000 ppm, about 9000 ppm, about 10,000 ppm, or any ranges between the specified values.

In some embodiments, the sweetener composition can include at least one sweetness enhancer in a concentration sufficient to further enhance the sweetness of rebaudioside J and/or the second sweetener but in a concentration below the sweetness enhancer's sweetness recognition threshold concentration. In certain embodiments, the sweetness enhancer can be present at a concentration below its sweetness recognition threshold concentration. For example, and in certain embodiments, the sweetener composition can contain up to about 2 weight percent each of D-psicose, erythritol, or combination thereof. In some embodiments, D-psicose and/or erythritol can be present in an amount ranging from about 0.5 to about 2.0 weight percent. Alternatively, D-psicose can be present in an amount ranging from about 0.5 to about 2.0 weight percent and erythritol can be present in an amount ranging from about 0.5 to about 1 weight percent.

Nonlimiting suitable sweetness enhancers include those known in the art. In some embodiments, the sweetener composition comprises, in addition to rebaudioside J, D-psicose, erythritol, rubusoside, rebaudioside B, rebaudioside C, trilobatin, phyllodulcin, brazzein, mogrosides, kokumi flavor compounds, a SWEETMYX flavor booster (Senomyx, San Diego, Calif.), or a combination of any of the foregoing.

In some embodiments, the sweetness enhancer can be a rare sugar supplemental sweetness enhancer. Exemplary rare sugars include D-psicose (also referred to as D-allulose), D-allose, L-ribose, D-tagatose, L-glucose, L-fucose, L-arabinose, D-turanose, D-leucrose, and combinations thereof.

In some embodiments, the sweetness enhancer can be a non-nutritive natural enhancer. Suitable non-nutritive natural enhancers include steviol glycosides. Suitable steviol glycosides, include, but are not limited to, stevioside, rebaudioside A, rebaudioside B, rebaudioside C, rebaudioside D, rebaudioside E, rebaudioside F, rebaudioside H, rebaudioside I, rebaudioside N, rebaudioside K, rebaudioside O, rebaudioside M, rubusoside, dulcoside A, iso-steviol glycosides such as iso-rebaudioside A, and combinations thereof. In a particular embodiment, the sweetness enhancer can be rubusoside, rebaudioside C or rebaudioside B. In other embodiments, the non-nutritive natural sweetness enhancer can be a mogrol glycoside. Suitable mogrol glycosides, include, but are not limited to, mogroside V, isomogroside, mogroside IV, siamenoside, and combinations thereof.

In some embodiments, the sweetness enhancer can be a sugar alcohol sweetness enhancer. Suitable sugar alcohols include erythritol, sorbitol, mannitol, xylitol, lactitol, isomalt, malitol, and mixture thereof.

In some embodiments, the sweetness enhancer can be a FEMA GRAS sweetness enhancers. Suitable FEMA GRAS enhancers include, but are not limited to, FEMA GRAS enhancer 4802, FEMA GRAS enhancer 4469, FEMA GRAS flavor 4701, FEMA GRAS enhancer 4720 (rebaudioside C), FEMA GRAS flavor 4774, FEMA GRAS enhancer 4708, FEMA GRAS enhancer 4728, FEMA GRAS enhancer 4601 (rebaudioside A) and combinations thereof.

In some embodiments, the sweetness enhancer can be a benzoic acid based sweetness enhancer.

Other suitable sweetness enhancers are known in the art, for example, as described in WO 2016/040577 A1, in U.S. Patent Application Publication Nos. 2014/0271996, US 2014/0093630, 2014/0094453, and 2014/0272068, along with U.S. Pat. No. 8,877,922, all of which are incorporated by reference in their entireties.

The sweetener composition disclosed herein can further comprise at least one component selected from the group consisting of flavoring agents, flowing agents, coloring agents, bulking agents, sugar alcohols, rare sugars, anti-caking agents, functional ingredients, and combinations thereof.

Food and Beverage Products Comprising Rebaudioside J

Rebaudioside J or the sweetener composition comprising rebaudioside J described herein can be included in various products to modify the sweetness, taste, and/or flavor of the products. The sweetener composition described herein can be provided in various forms.

In certain embodiments, the sweetener composition can be a dry blend sweetener. The dry blend sweetener composition can be a granular or powdered composition such as for use as a tabletop sweetener. Alternatively, the dry blend can be added to food products for baking or as a topping or to a liquid, such as to form a beverage from a powder e.g. chocolate milk, or Instant QUAKER Oats.

The dry blend sweetener composition can further include a binding or bulking agent, an anti-caking agents, and/or a flavor. Suitable binding or bulking agents include, but are not limited to maltodextrin, dextrose-maltodextrin blends, hydroxypropylmethyl cellulose, carboxymethyl cellulose, polyvinylpyrrolidone, and combinations thereof. Suitable anti-caking agents include, but are not limited to alumino silicate, magnesium carbonate, and combinations thereof.

In other embodiments, the sweetener composition can be provided in an aqueous formulation, the formulation comprising water and rebaudioside J.

In some embodiments, the present disclosure provides a beverage product comprising rebaudioside J or the sweetener composition described herein. In some embodiments, the beverage product can be selected from the group consisting of carbonated beverages, non-carbonated beverages, fountain beverages, frozen carbonated beverages, powdered concentrates, beverage concentrates, fruit juices, fruit juice-flavored drinks, fruit-flavored drinks, sports drinks, energy drinks, fortified/enhanced water drinks, soy drinks, vegetable drinks, grain-based drinks, malt beverages, fermented drinks, yogurt drinks, kefir, coffee beverages, tea beverages, dairy beverages, and mixtures of any of them. In other embodiments, the beverage product can be a beverage concentrate.

In some embodiments, the present disclosure provides a food product comprising a sweetening amount of rebaudioside J and at least one other food ingredient. In some embodiments, the food product can be a noncarbonated beverage, a carbonated beverage, a frozen beverage, or a dairy beverage.

In some embodiments, the beverage product can be a ready-to-drink beverage or a beverage concentrate. In some embodiments, the beverage product can be a low-calorie or a zero-calorie beverage product.

In some embodiments, the beverage can be a coffee drink, a cola drink, a tea drink, a juice drink, a dairy drink, a sports drink, an energy drink, or a flavored water drink.

In some embodiments, rebaudioside J can be present in an amount greater than the taste recognition threshold concentration of rebaudioside J in the beverage products disclosed herein.

In some embodiments, rebaudioside J can be present in a beverage product at a concentration of from about 50 ppm to about 750 ppm. In some embodiments, rebaudioside J can be present at a concentration of from about 50 ppm to about 700 ppm, from about 50 ppm to about 600 ppm, from about 50 ppm to about 500 ppm, from about 50 ppm to about 400 ppm, from about 50 ppm to about 350 ppm, from about 50 ppm to about 300 ppm, from about 50 ppm to about 250 ppm, from about 50 ppm to about 200 ppm, from about 50 ppm to about 150 ppm, or from about 50 ppm to about 100 ppm in the beverage products.

In some embodiments, rebaudioside J can be present in a beverage product at a concentration of from about 100 ppm to about 750 ppm, from about 150 ppm to about 750 ppm, from about 200 ppm to about 750 ppm, from about 250 ppm to about 750 ppm, from about 300 ppm to about 750 ppm, from about 3500 ppm to about 750 ppm, from about 400 ppm to about 750 ppm, from about 500 ppm to about 750 ppm, from about 600 ppm to about 750 ppm, or from about 700 ppm to about 750 ppm.

In some embodiments, rebaudioside J can be present in a beverage product at a concentration of from about 100 ppm to about 700 ppm, from about 150 ppm to about 650 ppm, from about 200 ppm to about 600 ppm, from about 250 ppm to about 550 ppm, from about 300 ppm to about 500 ppm, or from about 350 ppm to about 450 ppm.

In some embodiments, rebaudioside J can be present in a beverage concentrate, at a concentration of from about 300 ppm to about 5000 ppm, from about 400 ppm to about 4500 ppm, from about 500 ppm to about 4000 ppm, from about 600 ppm to about 3500 ppm, from about 700 ppm to about 3000 ppm, from about 800 ppm to about 2500 ppm, from about 900 ppm to about 2000 ppm, or from about 1000 ppm to about 1500 ppm.

In some embodiments, the beverage product further comprises at least one additional sweetener, wherein the at least one additional sweetener can be a nutritive sweetener, non-nutritive sweetener other than rebaudioside J, or a combination thereof.

In some embodiments, the at least one additional sweetener in the beverage product can be one or more steviol glycosides described elsewhere herein. In some embodiments, the one or more steviol glycosides can be a steviol glycoside selected from the group consisting of rebaudioside A, rebaudioside B, rebaudioside D, rebaudioside M, and combinations thereof. In some embodiments, the at least one additional sweetener can be rebaudioside B, rebaudioside D, or a combination thereof.

In some embodiments, the at least one additional sweetener can be rebaudioside B. In certain embodiments, rebaudioside J and rebaudioside B can be present in the beverage product in a ratio of about 99:1 to about 1:99, on a weight basis. In other embodiments, rebaudioside J and rebaudioside B can be present in the beverage product in a ratio of about 99:1, about 75:1, about 50:1, about 25:1, about 20:1, about 15:1, about 10:1, about 9:1, about 8:1, about 7:1, about 6:1, about 5:1, about 4.5:1, about 4:1, about 3.5:1, about 3:1, about 2.5:1, about 2:1, about 1.5:1, about 1:1, about 1:5, about 1:10, about 1:15, about 1:20, about 1:25, about 1:50, about 1:75, about 1:99, or any ranges between the specified values.

In other embodiments, rebaudioside B can be present at a concentration of from about 50 ppm to about 750 ppm, from about 100 ppm to about 700 ppm, from about 150 ppm to about 650 ppm, from about 200 ppm to about 600 ppm, from about 250 ppm to about 550 ppm, from about 300 ppm to about 500 ppm, or from about 350 ppm to about 450 ppm in the beverage products. In some embodiments, rebaudioside B can be present in a beverage concentrate, at a concentration of from about 300 ppm to about 5000 ppm, from about 400 ppm to about 4500 ppm, from about 500 ppm to about 4000 ppm, from about 600 ppm to about 3500 ppm, from about 700 ppm to about 3000 ppm, from about 800 ppm to about 2500 ppm, from about 900 ppm to about 2000 ppm, or from about 1000 ppm to about 1500 ppm.

In some embodiments, the at least one additional sweetener can be rebaudioside D.

In certain embodiments, rebaudioside J and rebaudioside D can be present in the beverage product in a ratio of about 99:1 to about 1:99, on a weight basis. In other embodiments, rebaudioside J and rebaudioside D can be present in the beverage product in a ratio of about 99:1, about 75:1, about 50:1, about 25:1, about 20:1, about 15:1, about 10:1, about 9:1, about 8:1, about 7:1, about 6:1, about 5:1, about 4.5:1, about 4:1, about 3.5:1, about 3:1, about 2.5:1, about 2:1, about 1.5:1, about 1:1, about 1:5, about 1:10, about 1:15, about 1:20, about 1:25, about 1:50, about 1:75, about 1:99, or any ranges between the specified values.

In other embodiments, rebaudioside D can be present at a concentration of from about 50 ppm to about 750 ppm, from about 100 ppm to about 700 ppm, from about 150 ppm to about 650 ppm, from about 200 ppm to about 600 ppm, from about 250 ppm to about 550 ppm, from about 300 ppm to about 500 ppm, or from about 350 ppm to about 450 ppm in the beverage products. In some embodiments, rebaudioside D can be present in a beverage concentrate at a concentration of from about 300 ppm to about 5000 ppm, from about 400 ppm to about 4500 ppm, from about 500 ppm to about 4000 ppm, from about 600 ppm to about 3500 ppm, from about 700 ppm to about 3000 ppm, from about 800 ppm to about 2500 ppm, from about 900 ppm to about 2000 ppm, or from about 1000 ppm to about 1500 ppm.

In certain embodiments, a beverage product in accordance with this disclosure can comprise water, rebaudioside J, an optional second sweetener, an acidulant, and a flavoring. Exemplary flavorings include, but are not limited to, cola flavoring, citrus flavoring, spice flavorings, and combinations thereof. Carbonation in the form of carbon dioxide can be added for effervescence. In certain embodiments, preservatives can be added if desired or necessary, depending upon factors including the presence of other ingredients, production technique, desired shelf life, etc. In certain embodiments, caffeine can be added to the beverage. Other suitable ingredients are described herein.

Certain exemplary embodiments of the beverage products disclosed here are cola-flavored carbonated beverages, characteristically containing, in addition to the ingredients included in the beverage products disclosed herein, carbonated water, sweetener, kola nut extract and/or other flavorings, caramel coloring, phosphoric acid, and optionally other ingredients. Additional and alternative suitable ingredients will be recognized by those skilled in the art given the benefit of this disclosure.

In some embodiments, the present disclosure provides a food product comprising rebaudioside J or the sweetener composition described herein. In some embodiments, the food product can be selected from the group consisting of oatmeal, cereal, baked goods, cookies, crackers, cakes, brownies, breads, snack foods, potato chips, tortilla chips, popcorn, snack bars, rice cakes, and grain-based food products.

It should be understood that the food or beverage products in accordance with this disclosure can have any of numerous different specific formulations or constitutions. The formulation of a food or beverage product in accordance with this disclosure can vary, depending upon such factors as the product's intended market segment, its desired nutritional characteristics, flavor profile, and the like. For example, further ingredients can be added to the formulation of a particular food or beverage embodiment. Further ingredients include, but are not limited to, one or more additional sweeteners in addition to any sweetener already present, flavorings, electrolytes, vitamins, fruit juices or other fruit products, tastants, masking agents, flavor enhancers, carbonation, or any combination of the foregoing. These can be added to any of the food or beverage compositions to vary the taste, mouthfeel, and/or nutritional characteristics of the food or beverage composition.

Natural Embodiments

Certain embodiments of the described compositions can be "natural" in that they do not contain anything artificial or synthetic (including any color additives regardless of source) that would not normally be expected to be in the food or beverage. As used herein, therefore, a "natural" food or beverage product is defined in accordance with the following guidelines: Raw materials for a natural ingredient exists or originates in nature. Biological synthesis involving fermentation and enzymes can be employed, but synthesis with chemical reagents is not utilized. Artificial colors, preservatives, and flavors are not considered natural ingredients. Ingredients may be processed or purified through certain specified techniques including at least: physical processes, fermentation, and enzymolysis. Appropriate processes and purification techniques include at least: absorption, adsorption, agglomeration, centrifugation, chopping, cooking (baking, frying, boiling, roasting), cooling, cutting, chromatography, coating, crystallization, digestion, drying (spray, freeze drying, vacuum), evaporation, distillation, electrophoresis, emulsification, encapsulation, extraction, extrusion, filtration, fermentation, grinding, infusion, maceration, microbiological (rennet, enzymes), mixing, peeling, percolation, refrigeration/freezing, squeezing, steeping, washing, heating, mixing, ion exchange, lyophilization, osmose, precipitation, salting out, sublimation, ultrasonic treatment, concentration, flocculation, homogenization, reconstitution, enzymolysis (using enzymes found in nature). Processing aids (currently defined as substances used as manufacturing aids to enhance the appeal or utility of a food or beverage component, including clarifying agents, catalysts, flocculants, filter aids, and crystallization inhibitors, etc. See 21 CFR § 170.3(o)(24)) are considered incidental additives and may be used if removed appropriately.

Additional Ingredients

In certain embodiments, the food or beverage products disclosed herein can contain a flavor composition, for example, natural, nature identical, and/or synthetic fruit flavors, botanical flavors, other flavors, and combinations thereof. As used herein, the term "fruit flavor" refers generally to those flavors derived from the edible reproductive part of a seed plant including those plants wherein a sweet pulp is associated with the seed, e.g., tomato, cranberry, and the like, and those having a small, fleshy berry. The term berry includes true berries as well as aggregate fruits, i.e., not "true" berries, but fruit commonly accepted as such. Also included within the term "fruit flavor" are synthetically prepared flavors made to simulate fruit flavors derived from natural sources. Examples of suitable fruit or berry sources include whole berries or portions thereof, berry juice, berry juice concentrates, berry purees and blends thereof, dried berry powders, dried berry juice powders, and the like.

Exemplary fruit flavors include the citrus flavors, e.g., orange, lemon, lime grapefruit, tangerine, mandarin orange, tangelo, and pomelo, apple, grape, cherry, and pineapple flavors. In certain embodiments, the food or beverage products comprise a fruit flavor component, e.g., a juice concentrate or juice. As used here, the term "botanical flavor" refers to flavors derived from parts of a plant other than the fruit. As such, botanical flavors can include those flavors derived from essential oils and extracts of nuts, bark, roots, and leaves. Also included within the term "botanical flavor" are synthetically prepared flavors made to simulate botanical flavors derived from natural sources. Examples of such flavors include cola flavors, tea flavors, and combinations thereof. The flavor component may further comprise a blend of several of the above-mentioned flavors. In certain exemplary embodiments of the food or beverage products, a cola flavor component can be used or a tea flavor component. The particular amount of the flavor component useful for imparting flavor characteristics to the food or beverage products of the present disclosure will depend upon the flavor(s) selected, the flavor impression desired, and the form of the flavor component. Those skilled in the art, given the benefit of this disclosure, will be readily able to determine the amount of any particular flavor component(s) used to achieve the desired flavor impression.

Juices suitable for use in certain exemplary embodiments of the food or beverage products disclosed herein include, e.g., fruit, vegetable and berry juices. Juices may be employed in the food or beverage products in the form of a concentrate, puree, single-strength juice, or other suitable forms. The term "juice" as used here includes single-strength fruit, berry, or vegetable juice, as well as concentrates, purees, milks, and other forms. Multiple different fruit, vegetable and/or berry juices can be combined, optionally along with other flavorings, to generate a concentrate or beverage having a desired flavor. Examples of suitable juice sources include plum, prune, date, currant, fig, grape, raisin, cranberry, pineapple, peach, banana, apple, pear, guava, apricot, Saskatoon berry, blueberry, plains berry, prairie berry, mulberry, elderberry, Barbados cherry (acerola cherry), choke cherry, date, coconut, olive, raspberry, strawberry, huckleberry, loganberry, currant, dewberry, boysenberry, kiwi, cherry, blackberry, quince, buckthorn, passion fruit, sloe, rowan, gooseberry, pomegranate, persimmon, mango, rhubarb, *papaya*, litchi, lemon, orange, lime, tangerine, mandarin, melon, watermelon, and grapefruit. Numerous additional and alternative juices suitable for use in at least certain exemplary embodiments will be apparent to those skilled in the art given the benefit of this disclosure.

In the compositions of the present disclosure employing juice, juice can be used, for example, at a level of at least about 0.2 weight percent of the composition. In certain embodiments juice can be employed at a level of from about 0.2 weight percent to about 40 weight percent. In further embodiments, juice can be used, if at all, in an amounts ranging from about 1 weight percent to about 20 weight percent.

Juices that are lighter in color can be included in the formulation of certain exemplary embodiments to adjust the flavor and/or increase the juice content of the beverage without darkening the beverage color. Examples of such juices include apple, pear, pineapple, peach, lemon, lime, orange, apricot, grapefruit, tangerine, rhubarb, cassis, quince, passion fruit, *papaya*, mango, guava, litchi, kiwi, mandarin, coconut, and banana. Deflavored and decolored juices can be employed if desired.

Other flavorings suitable for use in at least certain exemplary embodiments of the food or beverage products disclosed here include, e.g., spice flavorings, such as *cassia*, clove, cinnamon, pepper, ginger, vanilla spice flavorings, cardamom, coriander, root beer, *sassafras, ginseng,* and others. Numerous additional and alternative flavorings suitable for use in at least certain exemplary embodiments will be apparent to those skilled in the art given the benefit of this disclosure. Flavorings may be in the form of an extract, oleoresin, juice concentrate, bottler's base, or other forms known in the art. In at least certain exemplary embodiments, such spice or other flavors complement that of a juice or juice combination.

The one or more flavorings may be used in the form of an emulsion. A flavoring emulsion can be prepared by mixing some or all of the flavorings together, optionally together with other ingredients of the food or beverage, and an emulsifying agent. The emulsifying agent can be added with or after the flavorings mixed together. In certain exemplary embodiments the emulsifying agent can be water-soluble. Exemplary suitable emulsifying agents include gum acacia, modified starch, carboxymethylcellulose, gum tragacanth, gum ghatti and other suitable gums. Additional suitable emulsifying agents will be apparent to those skilled in the art of food or beverage formulations, given the benefit of this disclosure. The emulsifier in exemplary embodiments comprises greater than about 3% of the mixture of flavorings and emulsifier. In certain exemplary embodiments the emulsifier can be from about 5% to about 30% of the mixture.

Carbon dioxide can be used to provide effervescence to certain exemplary embodiments of the food or beverage products disclosed here. Any of the techniques and carbonating equipment known in the art for carbonating beverages can be employed. Carbon dioxide can enhance beverage taste and appearance and may aid in safeguarding the beverage purity by inhibiting and/or destroying objectionable bacteria. In certain embodiments, for example, the beverage can have a $CO_2$ level up to about 4.0 volumes carbon dioxide. Other embodiments can have, for example, from about 0.5 volume to about 5.0 volumes of carbon dioxide. As used herein, one volume of carbon dioxide refers to the amount of carbon dioxide absorbed by a given quantity of a given liquid, such as water, at 60° F. (16° C.) and one atmospheric pressure. A volume of gas occupies the same space as does the liquid by which it is dissolved. The carbon dioxide content can be selected by those skilled in the art based on the desired level of effervescence and the impact of the carbon dioxide on the taste or mouthfeel of the beverage.

In certain embodiments, caffeine can be added to any of the food or beverage products described herein. For example, the amount of caffeine added can be determined by the desired properties of a given beverage or syrup, and any applicable regulatory provisions of the country where the beverage or syrup is marketed. In certain embodiments caffeine can be included in an amount sufficient to provide a final beverage product having less than about 0.02 weight percent caffeine. The caffeine must be of purity acceptable for use in beverage food or beverage. The caffeine may be natural or synthetic in origin.

The food or beverage products disclosed here can contain additional ingredients, including, generally, any of those typically found in food or beverage formulations. Examples of such additional ingredients include, but are not limited to, caramel and other coloring agents or dyes, foaming or antifoaming agents, gums, emulsifiers, tea solids, cloud components, and mineral and non-mineral nutritional supplements. Examples of non-mineral nutritional supplement ingredients are known to those of ordinary skill in the art and include, for example, antioxidants and vitamins, including Vitamins A, D, E (tocopherol), C (ascorbic acid), B (thiamine), B2 (riboflavin), B6, B12, K, niacin, folic acid, biotin, and combinations thereof. The optional non-mineral nutritional supplements are typically present in amounts generally accepted under good manufacturing practices. Exemplary amounts can be between about 1% and about 100% Recommended Daily Value (RDV), where such RDVs are established. In certain exemplary embodiments the non-mineral nutritional supplement ingredient(s) can be present in an amount of from about 5% to about 20% RDV, where established.

Preservatives may be used in at least certain embodiments of the food or beverage products disclosed here. That is, at least certain exemplary embodiments can contain an optional dissolved preservative system. Solutions with a pH below 4 and especially those below 3 typically are "microstable," i.e., they resist growth of microorganisms, and so are suitable for longer term storage prior to consumption without the need for further preservatives. However, an additional preservative system can be used if desired. If a preservative system is used, it can be added to the product at any suitable time during production, e.g., in some cases prior to the addition of sweeteners. As used here, the terms "preservation system" or "preservatives" include all suitable preservatives approved for use in food or beverage compositions, including, without limitation, such known chemical preservatives as benzoates, e.g., sodium, calcium, and potassium benzoate, sorbates, e.g., sodium, calcium, and potassium sorbate, citrates, e.g., sodium citrate and potassium citrate, polyphosphates, e.g., sodium hexametaphosphate (SHMP), and combinations thereof, and antioxidants such as ascorbic acid, EDTA, BHA, BHT, TBHQ, dehydroacetic acid, dimethyldicarbonate, ethoxyquin, heptylparaben, and combinations thereof. Preservatives may be used in amounts not exceeding mandated maximum levels under applicable laws and regulations.

In the case of beverages in particular, the level of preservative used can be adjusted according to the planned final product pH and/or the microbiological spoilage potential of the particular beverage formulation. The maximum level employed typically can be about 0.05 weight percent of the beverage. It will be within the ability of those skilled in the art, given the benefit of this disclosure, to select a suitable preservative or combination of preservatives for beverage products according to this disclosure.

Other methods of preservation suitable for at least certain exemplary embodiments of the products disclosed here include, e.g., aseptic packaging and/or heat treatment or thermal processing steps, such as hot filling and tunnel pasteurization. Such steps can be used to reduce yeast, mold and microbial growth in the food or beverage products. For example, U.S. Pat. No. 4,830,862 discloses the use of pasteurization in the production of fruit juice beverages as well as the use of suitable preservatives in carbonated beverages. U.S. Pat. No. 4,925,686 discloses a heat-pasteurized freezable fruit juice composition which contains sodium benzoate and potassium sorbate. Both of these patents are incorporated by reference in their entireties. In general, heat treatment includes hot fill methods typically using high temperatures for a short time, e.g., about 190° F. for 10 seconds, tunnel pasteurization methods typically using lower temperatures for a longer time, e.g., about 160° F. for 10-15 minutes, and retort methods typically using, e.g., about 250° F. for 3-5 minutes at elevated pressure, i.e., at pressure above 1 atmosphere.

Suitable antioxidants may be selected from the group consisting of rutin, quercetin, flavonones, flavones, dihydroflavonols, flavonols, flavandiols, leucoanthocyanidins, flavonol glycosides, flavonone glycosides, isoflavonoids, and neoflavonoids. In particular, the flavonoids may be, but not limited to, quercetin, eriocitrin, neoeriocitrin, narirutin, naringin, hesperidin, hesperetin, neohesperidin, neoponcirin, poncirin, rutin, isorhoifolin, rhoifolin, diosmin, neodiosmin, sinensetin, nobiletin, tangeritin, catechin, catechin gallate, epigallocatechin, epigallocatechin gallate, oolong tea polymerized polyphenol, anthocyanin, heptamethoxyflavone, daidzin, daidzein, biochaminn A, prunetin, genistin, glycitein, glycitin, genistein, 6,7,4'-trihydroxy isoflavone, morin, apigenin, vitexin, balcalein, apiin, cupressuflavone, datiscetin, diosmetin, fisetin, galangin, gossypetin, geraldol, hinokiflavone, primuletin, pratol, luteolin, myricetin, orientin, robinetin, quercetagetin, and hydroxy-4-flavone.

Suitable food grade acids are water soluble organic acids and their salts and include, for example, phosphoric acid, sorbic acid, ascorbic acid, benzoic acid, citric acid, tartaric acid, propionic acid, butyric acid, acetic acid, succinic acid, glutaric acid, maleic acid, malic acid, valeric acid, caproic acid, malonic acid, aconitic acid, potassium sorbate, sodium benzoate, sodium citrate, amino acids, and combinations of any of them. Such acids are suitable for adjusting the pH of the food or beverage.

Suitable food grade bases are sodium hydroxide, potassium hydroxide, and calcium hydroxide. Such bases also are suitable for adjusting the pH of a food or beverage.

Method of Modulating Sweetness Profile

Rebaudioside J described herein can be used to modulate the sweetness profile of a sweetener. Any effective amount of rebaudioside J can be added to the product to modulate the sweetness profile of the sweetener. For example, rebaudioside J can be added in an amount sufficient to increase the overall sweetness, decrease the sweetness time-of-onset, decrease bitter, metallic and licorice off-notes, and/or improve sweet quality (e.g., roundness) of the sweetener. In certain embodiments, rebaudioside J can be added in an amount to achieve a concentration in the product ranging from about 30 ppm to about 300 ppm (e.g., about 30 ppm, about 50 ppm, about 100 ppm, about 150 ppm, about 200 ppm, about 250 ppm, about 300 ppm, or any ranges between the recited values). In other embodiments, rebaudioside J can be added in an amount to achieve a concentration in the product of at least 30 ppm, at least 50 ppm, at least 100 ppm, at least 150 ppm, at least 200 ppm, at least 250 ppm, or at least 300 ppm.

In some embodiments, the method comprises adding rebaudioside J in an effective amount to improve the overall sweetness of a product. In some embodiments, the product can be a sweetened beverage comprising a nutritive sweetener. In some embodiments, the nutritive sweetener can be high-fructose corn syrup (HFCS). In some embodiments, rebaudioside J can be added in an amount to achieve a concentration in the product ranging from about 30 ppm to about 300 ppm. In some embodiments, rebaudioside J can be added in an effective amount to increase the overall sweetness of the product by about 10%, about 20%, about 30%, or about 40% compared to that of the product before adding rebaudioside J. In some embodiments, rebaudioside J can be added in a sufficient amount to increase the overall sweetness of a 6% HFCS solution so that it tastes as sweet as an 8% HFCS solution. In other words, adding rebaudioside J increases the overall sweetness by about 33%. In some embodiments, rebaudioside J can be added in an amount to achieve a concentration in the product ranging from about 30 ppm to about 100 ppm.

In some embodiments, the method comprises adding rebaudioside J in an effective amount to decrease the sweetness time-of-onset of a sweetener in the product. In some embodiments, the sweetener can be a high potency sweetener such as steviol glycoside, for example, rebaudioside A. In some embodiments, rebaudioside J can be added in an amount to achieve a concentration in the product ranging from about 30 ppm to about 300 ppm, from about 30 ppm to about 250 ppm, from about 30 ppm to about 200 ppm, from about 30 ppm to about 150 ppm, or from about 30 ppm to about 100 ppm. In some embodiments, the sweetener (e.g., rebaudioside A) can be present in the product in a concentration from about 1 ppm to about 600 ppm, from about 10 ppm to about 500 ppm, from about 50 ppm to about 400 ppm, or from about 100 ppm to about 300 ppm. In particular embodiments, the method comprises adding rebaudioside J in an effective amount to shorten the sweetness time-of-onset of the product. In some embodiments, the product can be a beverage product comprising about 300 ppm of a steviol glycoside such as rebaudioside A.

In some embodiments, the method comprises adding rebaudioside J in an effective amount to decrease bitter, metallic and/or licorice off-notes of the product. In other embodiments, the method comprises adding rebaudioside J in an effective amount to improve the sugar-like roundness of the product. In some embodiments, the product can be a beverage product. In some embodiments, the sweetener can be a high potency sweetener such as steviol glycoside, for example, rebaudioside A. In some embodiments, rebaudioside J can be added in an amount to achieve a concentration in the product ranging from about 30 ppm to about 300 ppm, from about 30 ppm to about 250 ppm, from about 30 ppm to about 200 ppm, from about 30 ppm to about 150 ppm, or from about 30 ppm to about 100 ppm. In some embodiments, the sweetener (e.g., rebaudioside A) can be present in the product in a concentration from about 1 ppm to about 600 ppm, from about 10 ppm to about 500 ppm, from about 50 ppm to about 400 ppm, or from about 100 ppm to about 300 ppm. In particular embodiments, the method comprises adding rebaudioside J in an amount to achieve a concentration in the product ranging from about 30 ppm to about 300 ppm. In some embodiments, the beverage product comprises about 300 ppm of a steviol glycoside such as rebaudioside A.

Methods of Modifying Sensorial Attributes Using Rebaudioside J and Compositions Comprising a Sweetener Modified by Rebaudioside J Surprisingly, in ready-to-consume food products, rebaudioside J, at concentrations below its sweetness recognition threshold concentration, i.e. less than about 40 ppm, can be used to modify a sweetener's sensorial attributes. For example, rebaudioside J can be added in an amount sufficient to achieve a "modifying concentration" of rebaudioside J, i.e. concentration of rebaudioside J ranging from about 1 to less than about 40 ppm, to a product comprising a sweetener or combination of sweeteners, to increase the sweetener's overall sweetness, decrease the sweetener's sweetness onset delay, shorten the sweetener's sweetness linger, decrease the sweetener's bitter, astringent, metallic and/or licorice off-notes, and/or improve the sweetener's sweet qualities, such as, for example, roundness.

In order to achieve the benefits noted above, and in certain embodiments, rebaudioside J can be added to a ready-to-consume food product comprising a sweetener, in an amount sufficient to achieve a rebaudioside J concentration in the product ranging from about 1 ppm to about 40 ppm. For example, in certain embodiments rebaudioside J can be added to the ready-to-consume food product in an amount sufficient to achieve a concentration in the product ranging from about 5 ppm to about 35 ppm, from about 10 ppm to about 30 ppm, from about 10 ppm to about 25 ppm, or from about 10 ppm to about 20 ppm. In some embodiments, rebaudioside J can be added in an amount sufficient to achieve a concentration in the ready-to-consume food product ranging from about 12 ppm to about 25 ppm.

In other embodiments rebaudioside J can be added to the ready-to-consume food product in an amount sufficient to achieve a concentration in the product of about 1 ppm, about 2 ppm, 3 ppm, about 4 ppm, about 5 ppm, about 6 ppm, about 7 ppm, about 8 ppm, about 9 ppm, about 10 ppm, about 11 ppm, about 12 ppm, about 13 ppm, about 14 ppm, about 15 ppm, about 16 ppm, about 17 ppm, about 18 ppm, about 19 ppm, about 20 ppm, about 21 ppm, about 22 ppm, about 23 pm, about 24 ppm, about 25 ppm, about 26 ppm, about 27 ppm, about 28 ppm, about 29 ppm, about 30 ppm, about 31 ppm, about 32 ppm, about 33 ppm, about 34 ppm, about 35 ppm, about 36 ppm, about 37 ppm, about 38 ppm, about 39 ppm, about 40 ppm, or any ranges between any of these values. In particular embodiments rebaudioside J can be added to the ready-to-consume food product in an amount sufficient to achieve a concentration of about 12 ppm rebaudioside J, about 15 ppm rebaudioside J, about 18 ppm rebaudioside J, about 20 ppm rebaudioside J, about 22 ppm rebaudioside J, or about 24 ppm rebaudioside J.

In certain embodiments, the sweetener modified by rebaudioside J can be a nutritive or non-nutritive natural or synthetic sweetener, or a combination of such sweeteners. In some embodiments, the sweetener or sweeteners modified by rebaudioside J can be a nutritive sweetener or combination of such sweeteners. Exemplary nutritive sweeteners include, but are not limited to, crystalline or liquid sucrose, fructose, glucose, dextrose, maltose, trehalose, fructo-oligosaccharides, glucose-fructose syrup from natural sources such as apple, chicory, and honey; high fructose corn syrup, invert sugar, maple syrup, maple sugar, honey, brown sugar molasses, cane molasses, such as first molasses, second molasses, blackstrap molasses, and sugar beet molasses, sorghum syrup, and combinations thereof. In certain embodiments, the nutritive sweetener modified by rebaudioside J can be glucose, high-fructose corn syrup, or a combination thereof. In particular embodiments, the nutritive sweetener modified by rebaudioside J can be high-fructose corn syrup (HFCS). In other embodiments, the nutritive sweetener modified by rebaudioside J can be sucrose.

In certain embodiments, the ready-to-consume food product comprising a modifying concentration of rebaudioside J can comprise one or more nutritive sweeteners in an amount ranging from about 1% to about 20% by weight, such as from about 3% to about 16% by weight, from about 3% to about 10% by weight, from about 3% to about 8% by weight, or from about 3% to about 6% by weight, depending upon the desired level of sweetness. In certain embodiments the ready-to-consume food comprising a modifying concentration of rebaudioside J product can comprise about 3.5% by weight of the one or more nutritive sweeteners. In other embodiments the ready-to-consume food product comprising a modifying concentration of rebaudioside J can comprise about 5% by weight of the one or more nutritive sweeteners.

In particular embodiments, the ready-to-consume food product comprising a modifying concentration of rebaudioside J can comprise HFCS or sucrose in an amount ranging from about 1% to about 20% by weight, such as from about 3% to about 16% by weight, from about 3% to about 10% by weight, from about 3% to about 8% by weight, or about 3% to about 6% by weight, depending upon the desired level of sweetness. In certain embodiments the ready-to-consume food product comprising a modifying concentration of rebaudioside J can comprise about 3.5% by weight sucrose or HCFS. In other embodiments the ready-to-consume food product comprising a modifying concentration of rebaudioside J can comprise about 5% by weight HCFS or sucrose.

In still further embodiments, the ready-to-consume food product can comprise HFCS or sucrose in an amount ranging from about 1% to about 20% by weight and about 1 ppm to less than 40 ppm rebaudioside J. In particular embodiments, the ready-to-consume food product can comprise about 3.5% by weight sucrose or HCFS and about 1 ppm to less than 40 ppm rebaudioside J. In other embodiments the ready-to-consume food product comprising a modifying concentration of rebaudioside J can comprise about 5% by weight HCFS or sucrose and about 1 ppm to less than 40 ppm rebaudioside J.

In particular embodiments the ready-to-consume food product can comprise about 3.5% by weight sucrose and about 12 ppm rebaudioside J, about 3.5% by weight sucrose and about 15 ppm rebaudioside J, about 3.5% by weight sucrose and about 18 ppm rebaudioside J, about 3.5% by weight sucrose and about 20 ppm rebaudioside J, about 3.5% by weight sucrose and about 22 ppm rebaudioside J, or about 3.5% by weight sucrose and about 24 ppm rebaudioside J.

In other embodiments the ready-to-consume food product can comprise about 5% by weight sucrose and about 12 ppm rebaudioside J, about 5% by weight sucrose and about 15 ppm rebaudioside J, about 5% by weight sucrose and about 18 ppm rebaudioside J, about 5% by weight sucrose and about 20 ppm rebaudioside J, about 5% by weight sucrose and about 22 ppm rebaudioside J, or about 5% by weight sucrose and about 24 ppm rebaudioside J.

In certain embodiments the ready-to-consume food product can comprise about 3.5% by weight HCFS and about 12 ppm rebaudioside J, about 3.5% by weight HCFS and about 15 ppm rebaudioside J, about 3.5% by weight HCFS and about 18 ppm rebaudioside J, about 3.5% by weight HCFS and about 20 ppm rebaudioside J, about 3.5% by weight HCFS and about 22 ppm rebaudioside J, or about 3.5% by weight HCFS and about 24 ppm rebaudioside J.

In still further embodiments the ready-to-consume food product can comprise about 5% by weight HCFS and about 12 ppm rebaudioside J, about 5% by weight HCFS and about 15 ppm rebaudioside J, about 5% by weight HCFS and about 18 ppm rebaudioside J, about 5% by weight HCFS and about 20 ppm rebaudioside J, about 5% by weight HCFS and about 22 ppm rebaudioside J, or about 5% by weight HCFS and about 24 ppm rebaudioside J.

In certain embodiments, the sweetener or sweeteners modified by the modifying concentration of rebaudioside J can be a non-nutritive sweetener or combination of such sweeteners. Exemplary non-nutritive sweeteners suitable to be modified by rebaudioside J include, but are not limited to, Lo Han Guo, stevioside, steviolbioside, rubusoside, dulcoside A, rebaudioside A, rebaudioside B, rebaudioside C, rebaudioside D, rebaudioside E, rebaudioside F, rebaudioside G, rebaudioside H, rebaudioside I, rebaudioside K, rebaudioside L, rebaudioside M, rebaudioside O, SG95, acesulfame-K, advantame, aspartame, neotame, saccharin, sucralose, neohespiridin dihydrochalcone, glycyrrhizin, and combinations thereof.

In certain embodiments the non-nutritive sweetener, or combination of such sweeteners, can be present in the ready-to-consume food product comprising a modifying concentration of rebaudioside J in a total non-nutritive sweetener concentration ranging from about 50 ppm to about 750 ppm, from about 100 ppm to about 700 ppm, from about 150 ppm to about 650 ppm, from about 150 ppm to about 600 ppm, from about 150 ppm to about 550 ppm, from about 150 ppm to about 500 ppm, from about 150 ppm to about 450 ppm from about 150 ppm to about 400 ppm, from about 150 ppm to about 350 ppm, or from about 150 ppm to about 300 ppm.

In certain embodiments the non-nutritive sweetener, or combination of such sweeteners, can be present in the ready-to-consume food product comprising a modifying concentration of rebaudioside J in a total non-nutritive sweetener concentration of about 80 ppm, about 90 ppm, about 100 ppm, about 110 ppm, about 120 ppm, about 130 ppm, about 140 ppm, about 150 ppm, about 160 ppm, about 170 ppm, about 180 ppm, about 190 ppm, about 200 ppm, about 210 ppm, about 220 ppm, about 230 ppm, about 240 ppm, about 250 ppm, about 260 ppm, about 270 ppm, about 280 ppm, about 290 ppm, about 300 ppm, about 310 ppm, about 320 ppm, about 330 ppm, about 340 ppm, or about 350 ppm, or any ranges between these values.

In still other embodiments the non-nutritive sweetener can be present in the ready-to-consume food product comprising a modifying concentration of rebaudioside J in a concentration of about 125 ppm, about 180 ppm, or about 300 ppm.

In some embodiments, the non-nutritive sweetener modified by rebaudioside J can be selected from the group consisting of SG95, rebaudioside A, rebaudioside B, rebaudioside D, rebaudioside M, and combinations thereof. For example, in some embodiments, the non-nutritive sweetener modified by rebaudioside J can be SG95. In other embodiments, the non-nutritive sweetener modified by rebaudioside J can be rebaudioside A. In other embodiments, the non-nutritive sweetener modified by rebaudioside J can be rebaudioside B. In other embodiments, the non-nutritive sweetener modified by rebaudioside J can be rebaudioside D. In still other embodiments, the non-nutritive sweetener modified by rebaudioside J can be rebaudioside M.

For example, and in certain embodiments, the non-nutritive sweetener being modified can be a combination of rebaudiosides A and M; rebaudiosides A and B; rebaudiosides A and D; rebaudiosides B and D; rebaudiosides B and M; rebaudiosides D and M; rebaudiosides A, B, D, and M; rebaudiosides A, B and D; rebaudiosides A, B and M; rebaudiosides A, D and M; or rebaudiosides B, D and M.

In certain embodiments, a modifying concentration of rebaudioside J can be used to modify the sensorial attributes of one or more steviol glycosides in a ready-to-consume food product comprising from about 50 ppm to about 750 ppm total steviol glycoside concentration. In other embodiments, a modifying concentration of rebaudioside J can be used to modify the sensorial attributes of rebaudioside A in a ready-to-consume food product comprising about 50 to about 750 ppm rebaudioside A. In other embodiments a modifying concentration of rebaudioside J can be used to modify the sensorial attributes of rebaudioside A in a ready-to-consume food product comprising about 100 ppm to about 700 ppm rebaudioside A, about 150 ppm to about 650 ppm rebaudioside A, about 150 ppm to about 600 ppm rebaudioside A, about 150 ppm to about 550 ppm rebaudioside A, about 150 ppm to about 500 ppm rebaudioside A, about 150 ppm to about 450 ppm rebaudioside A, about 150 ppm to about 400 ppm rebaudioside A, about 150 ppm to about 350 ppm rebaudioside A, or about 150 ppm to about 300 ppm rebaudioside A.

In certain embodiments a modifying concentration of rebaudioside J can be used to modify the sensorial attributes of rebaudioside A in a ready-to-consume food product comprising about 80 ppm, about 90 ppm, about 100 ppm, about 110 ppm, about 120 ppm, about 130 ppm, about 140 ppm, about 150 ppm, about 160 ppm, about 170 ppm, about 180 ppm, about 190 ppm, about 200 ppm, about 210 ppm, about 220 ppm, about 230 ppm, about 240 ppm, about 250 ppm, about 260 ppm, about 270 ppm, about 280 ppm, about 290 ppm, about 300 ppm, about 310 ppm, about 320 ppm, about 330 ppm, about 340 ppm, or about 350 ppm rebaudioside A, or any ranges between these values.

In certain embodiments, about 20 ppm of rebaudioside J can be used to modify the sensorial attributes of rebaudioside A in a ready-to-consume food product comprising about 120 ppm rebaudioside A, about 180 ppm rebaudioside A, or about 300 ppm rebaudioside A. In other embodiments, about 8 ppm of rebaudioside J can be used to modify the sensorial attributes of rebaudioside A in a ready-to-consume food product comprising about 125 ppm rebaudioside A. In other embodiments, about 15 ppm of rebaudioside J can be used to modify the sensorial attributes of rebaudioside A in a ready-to-consume food product comprising about 230 ppm rebaudioside A. In another embodiment, about 12 ppm of rebaudioside J can be used to modify the sensorial attributes of rebaudioside A in a ready-to-consume food product comprising about 300 ppm rebaudioside A. In yet another embodiment, about 25 ppm of rebaudioside J can be used to modify the sensorial attributes of rebaudioside A in a ready-to-consume food product comprising about 300 ppm rebaudioside A.

In other embodiments, a modifying concentration of rebaudioside J can be used to modify the sensorial attributes of rebaudioside B in a ready-to-consume food product comprising about 50 to about 750 ppm rebaudioside B. In other embodiments a modifying concentration of rebaudioside J can be used to modify the sensorial attributes of rebaudioside B in a ready-to-consume food product comprising about 100 ppm to about 700 ppm rebaudioside B, about 150 ppm to about 650 ppm rebaudioside B, about 150 ppm to about 600 ppm rebaudioside B, about 150 ppm to about 550 ppm rebaudioside B, about 150 ppm to about 500 ppm rebaudioside B, about 150 ppm to about 450 ppm rebaudioside B, about 150 ppm to about 400 ppm rebaudioside B, about 150 ppm to about 350 ppm rebaudioside B, or about 150 ppm to about 300 ppm rebaudioside B.

In certain embodiments a modifying concentration of rebaudioside J can be used to modify the sensorial attributes of rebaudioside B in a ready-to-consume food product comprising about 80 ppm, about 90 ppm, about 100 ppm, about 110 ppm, about 120 ppm, about 130 ppm, about 140 ppm, about 150 ppm, about 160 ppm, about 170 ppm, about 180 ppm, about 190 ppm, about 200 ppm, about 210 ppm, about 220 ppm, about 230 ppm, about 240 ppm, about 250 ppm, about 260 ppm, about 270 ppm, about 280 ppm, about 290 ppm, about 300 ppm, about 310 ppm, about 320 ppm, about 330 ppm, about 340 ppm, or about 350 ppm rebaudioside B, or any ranges between these values.

In certain embodiments, about 20 ppm of rebaudioside J can be used to modify the sensorial attributes of rebaudioside B in a ready-to-consume food product comprising about 180 ppm rebaudioside B, about 120 ppm rebaudioside B, or about 300 ppm rebaudioside B. In other embodiments, about 8 ppm of rebaudioside J can be used to modify the sensorial attributes of rebaudioside B in a ready-to-consume food product comprising about 125 ppm rebaudioside B. In another embodiment, about 15 ppm of rebaudioside J can be used to modify the sensorial attributes of rebaudioside B in a ready-to-consume food product comprising about 230 ppm rebaudioside B. In yet another embodiment, about 12 ppm of rebaudioside J can be used to modify the sensorial attributes of rebaudioside B in a ready-to-consume food product comprising about 300 ppm rebaudioside B. In a particular embodiment, about 25 ppm of rebaudioside J can be used to modify the sensorial attributes of rebaudioside B in a ready-to-consume food product comprising about 300 ppm rebaudioside B.

In other embodiments, a modifying concentration of rebaudioside J can be used to modify the sensorial attributes of rebaudioside D in a ready-to-consume food product comprising about 50 to about 750 ppm rebaudioside D, about 100 ppm to about 700 ppm rebaudioside D, about 150 ppm to about 650 ppm rebaudioside D, about 150 ppm to about 600 ppm rebaudioside D, about 150 ppm to about 550 ppm rebaudioside D, about 150 ppm to about 500 ppm rebaudioside D, about 150 ppm to about 450 ppm rebaudioside D, about 150 ppm to about 400 ppm rebaudioside D, about 150 ppm to about 350 ppm rebaudioside D, or about 150 ppm to about 300 ppm rebaudioside D.

In certain embodiments a modifying concentration of rebaudioside J can be used to modify the sensorial attributes of rebaudioside D in a ready-to-consume food product comprising about 80 ppm, about 90 ppm, about 100 ppm, about 110 ppm, about 120 ppm, about 130 ppm, about 140 ppm, about 150 ppm, about 160 ppm, about 170 ppm, about 180 ppm, about 190 ppm, about 200 ppm, about 210 ppm, about 220 ppm, about 230 ppm, about 240 ppm, about 250 ppm, about 260 ppm, about 270 ppm, about 280 ppm, about 290 ppm, about 300 ppm, about 310 ppm, about 320 ppm, about 330 ppm, about 340 ppm, or about 350 ppm rebaudioside D, or any ranges between these values.

In still other embodiments, about 20 ppm of rebaudioside J can be used to modify the sensorial attributes of rebaudioside D in a ready-to-consume food product comprising about 180 ppm rebaudioside D, about 120 ppm rebaudioside D, or about 300 ppm rebaudioside D. In other embodiments, about 8 ppm of rebaudioside J can be used to modify the sensorial attributes of rebaudioside D in a ready-to-consume food product comprising about 125 ppm rebaudioside D. In one embodiment, about 15 ppm of rebaudioside J can be used to modify the sensorial attributes of rebaudioside D in a ready-to-consume food product comprising about 230 ppm rebaudioside D. In another embodiment, about 12 ppm of rebaudioside J can be used to modify the sensorial attributes of rebaudioside D in a ready-to-consume food product comprising about 300 ppm rebaudioside D. In yet a further embodiment, about 25 ppm of rebaudioside J can be used to modify the sensorial attributes of rebaudioside D in a ready-to-consume food product comprising about 300 ppm rebaudioside D.

In still other embodiments, a modifying concentration of rebaudioside J can be used to modify the sensorial attributes of rebaudioside M in a ready-to-consume food product comprising about 50 to about 750 ppm rebaudioside M, about 100 ppm to about 700 ppm rebaudioside M, about 150 ppm to about 650 ppm rebaudioside M, about 150 ppm to about 600 ppm rebaudioside M, about 150 ppm to about 550 ppm rebaudioside M, about 150 ppm to about 500 ppm rebaudioside M, about 150 ppm to about 450 ppm rebaudioside M, about 150 ppm to about 400 ppm rebaudioside M, about 150 ppm to about 350 ppm rebaudioside M, or about 150 ppm to about 300 ppm rebaudioside M.

In certain embodiments a modifying concentration of rebaudioside J can be used to modify the sensorial attributes of rebaudioside M in a ready-to-consume food product comprising about 80 ppm, about 90 ppm, about 100 ppm, about 110 ppm, about 120 ppm, about 130 ppm, about 140 ppm, about 150 ppm, about 160 ppm, about 170 ppm, about 180 ppm, about 190 ppm, about 200 ppm, about 210 ppm, about 220 ppm, about 230 ppm, about 240 ppm, about 250 ppm, about 260 ppm, about 270 ppm, about 280 ppm, about 290 ppm, about 300 ppm, about 310 ppm, about 320 ppm, about 330 ppm, about 340 ppm, or about 350 ppm rebaudioside M, or any ranges between these values.

In some embodiments, about 20 ppm of rebaudioside J can be used to modify the sensorial attributes of rebaudioside M in a ready-to-consume food product comprising about 180 ppm, about 120 ppm, or about 300 ppm rebaudioside M. In other embodiments, about 8 ppm of rebaudioside J can be used to modify the sensorial attributes of rebaudioside M in a ready-to-consume food product comprising about 125 ppm rebaudioside M. In another embodiment, about 15 ppm of rebaudioside J can be used to modify the sensorial attributes of rebaudioside M in a ready-to-consume food product comprising about 230 ppm rebaudioside M. In yet another embodiment, about 12 ppm of rebaudioside J can be used to modify the sensorial attributes of rebaudioside M in a ready-to-consume food product comprising about 300 ppm rebaudioside M. And in a further embodiment, about 25 ppm of rebaudioside J can be used to modify the sensorial attributes of rebaudioside M in a ready-to-consume food product comprising about 300 ppm rebaudioside M.

In still further embodiments, a modifying concentration of rebaudioside J can be used to modify the sensorial attributes of SG95 in a ready-to-consume food product comprising about 50 ppm to about 750 ppm SG95. For example, and in certain embodiments, a modifying concentration of rebaudioside J can be used to modify the sensorial attributes of SG95 in a ready-to-consume food product comprising about 100 ppm to about 700 ppm SG95, about 150 ppm to about 650 ppm SG95, about 150 ppm to about 600 ppm SG95, about 150 ppm to about 550 ppm SG95, about 150 ppm to about 500 ppm SG95, about 150 ppm to about 450 ppm SG95, about 150 ppm to about 400 ppm SG95, about 150 ppm to about 350 ppm SG95, or about 150 ppm to about 300 ppm SG95.

In certain embodiments a modifying concentration of rebaudioside J can be used to modify the sensorial attributes of SG95 in a ready-to-consume food product comprising about 80 ppm, about 90 ppm, about 100 ppm, about 110 ppm, about 120 ppm, about 130 ppm, about 140 ppm, about 150 ppm, about 160 ppm, about 170 ppm, about 180 ppm, about 190 ppm, about 200 ppm, about 210 ppm, about 220 ppm, about 230 ppm, about 240 ppm, about 250 ppm, about 260 ppm, about 270 ppm, about 280 ppm, about 290 ppm, about 300 ppm, about 310 ppm, about 320 ppm, about 330 ppm, about 340 ppm, or about 350 ppm rebaudioside SG95, or any ranges between these values.

In a particular embodiment, about 20 ppm of rebaudioside J can be used to modify the sensorial attributes of SG95 in a ready-to-consume food product comprising about 180 ppm SG95, about 120 ppm SG95, or about 300 ppm SG95. In other embodiments, about 8 ppm of rebaudioside J can be used to modify the sensorial attributes of SG95 in a ready-to-consume food product comprising about 125 ppm SGS. In another embodiment, about 15 ppm of rebaudioside J can be used to modify the sensorial attributes of SG95 in a ready-to-consume food product comprising about 230 ppm SG95. In yet another embodiment, about 12 ppm of rebaudioside J can be used to modify the sensorial attributes of SG95 in a ready-to-consume food product comprising about 300 ppm SG95. And in a further embodiment, about 25 ppm of rebaudioside J can be used to modify the sensorial attributes of SG95 in a ready-to-consume food product comprising about 300 ppm SG95.

In some embodiments, the non-nutritive sweetener modified by rebaudioside J can be selected from the group consisting of aspartame, mogroside V, sucralose, acesulfame-K, or a combination thereof.

In particular embodiments, a modifying concentration of rebaudioside J can be used to modify the sensorial attributes of mogroside V in a ready-to-consume food product comprising about 50 to about 750 ppm mogroside V, about 100 ppm to about 700 ppm mogroside V, about 150 ppm to about 650 ppm mogroside V, about 150 ppm to about 600 ppm mogroside V, about 150 ppm to about 550 ppm mogroside V, about 150 ppm to about 500 ppm mogroside V, about 150 ppm to about 450 ppm mogroside V, about 150 ppm to about 400 ppm mogroside V, about 150 ppm to about 350 ppm mogroside V, or about 150 ppm to about 300 ppm mogroside V.

In certain embodiments a modifying concentration of rebaudioside J can be used to modify the sensorial attributes of mogroside V in a ready-to-consume food product comprising about 80 ppm, about 90 ppm, about 100 ppm, about 110 ppm, about 120 ppm, about 130 ppm, about 140 ppm, about 150 ppm, about 160 ppm, about 170 ppm, about 180 ppm, about 190 ppm, about 200 ppm, about 210 ppm, about 220 ppm, about 230 ppm, about 240 ppm, about 250 ppm, about 260 ppm, about 270 ppm, about 280 ppm, about 290 ppm, about 300 ppm, about 310 ppm, about 320 ppm, about 330 ppm, about 340 ppm, or about 350 ppm mogroside V, or any ranges between these values.

In certain embodiments, about 20 ppm of rebaudioside J can be used to modify the sensorial attributes of mogroside V in a ready-to-consume food product comprising about 129 ppm, about 180 ppm, or about 300 ppm mogroside V. In other embodiments, about 8 ppm of rebaudioside J can be used to modify the sensorial attributes of mogroside V in a ready-to-consume food product comprising about 125 ppm mogroside V. In certain embodiments, about 15 ppm of rebaudioside J can be used to modify the sensorial attributes of mogroside V in a ready-to-consume food product comprising about 230 ppm mogroside V. In yet another embodiment, about 12 ppm of rebaudioside J can be used to modify the sensorial attributes of mogroside V in a ready-to-consume food product comprising about 300 ppm mogroside V. In still another embodiment, about 25 ppm of rebaudioside J can be used to modify the sensorial attributes of mogroside V in a ready-to-consume food product comprising about 300 ppm mogroside V.

In particular embodiments, a modifying concentration of rebaudioside J can be used to modify the sensorial attributes of sucralose in a ready-to-consume food product comprising about 50 to about 750 ppm sucralose, about 100 ppm to about 700 ppm sucralose, about 150 ppm to about 650 ppm sucralose, about 150 ppm to about 600 ppm sucralose, about 150 ppm to about 550 ppm sucralose, about 150 ppm to about 500 ppm sucralose, about 150 ppm to about 450 ppm sucralose, about 150 ppm to about 400 ppm sucralose, about 150 ppm to about 350 ppm sucralose, or about 150 ppm to about 300 ppm sucralose.

In certain embodiments a modifying concentration of rebaudioside J can be used to modify the sensorial attributes of sucralose in a ready-to-consume food product comprising about 80 ppm, about 90 ppm, about 100 ppm, about 110 ppm, about 120 ppm, about 130 ppm, about 140 ppm, about 150 ppm, about 160 ppm, about 170 ppm, about 180 ppm, about 190 ppm, about 200 ppm, about 210 ppm, about 220 ppm, about 230 ppm, about 240 ppm, about 250 ppm, about 260 ppm, about 270 ppm, about 280 ppm, about 290 ppm, about 300 ppm, about 310 ppm, about 320 ppm, about 330 ppm, about 340 ppm, or about 350 ppm sucralose, or any ranges between these values.

In a particular embodiment, about 20 ppm of rebaudioside J can be used to modify the sensorial attributes of sucralose in a ready-to-consume food product comprising about 120 ppm sucralose, about 180 ppm sucralose, or about 300 ppm sucralose. In other embodiments, about 8 ppm of rebaudioside J can be used to modify the sensorial attributes of sucralose in a ready-to-consume food product comprising about 125 ppm sucralose. In certain embodiments, about 15 ppm of rebaudioside J can be used to modify the sensorial attributes of sucralose in a ready-to-consume food product comprising about 230 ppm sucralose. In still further embodiments, about 12 ppm of rebaudioside J can be used to modify the sensorial attributes of sucralose in a ready-to-consume food product comprising about 300 ppm sucralose. And in other embodiments, about 25 ppm of rebaudioside J can be used to modify the sensorial attributes of sucralose in a ready-to-consume food product comprising about 300 ppm sucralose.

In other embodiments, a modifying concentration of rebaudioside J can be used to modify the sensorial attributes of acesulfame-K in a ready-to-consume food product comprising about 50 to about 750 ppm acesulfame-K, 100 ppm to about 700 ppm acesulfame-K, about 150 ppm to about 650 ppm acesulfame-K, about 150 ppm to about 600 ppm acesulfame-K, about 150 ppm to about 550 ppm acesulfame-K, about 150 ppm to about 500 ppm acesulfame-K, about 150 ppm to about 450 ppm acesulfame-K, about 150 ppm to about 400 ppm acesulfame-K, about 150 ppm to about 350 ppm acesulfame-K, or about 150 ppm to about 300 ppm acesulfame-K.

In certain embodiments a modifying concentration of rebaudioside J can be used to modify the sensorial attributes of acesulfame-K in a ready-to-consume food product comprising about 80 ppm, about 90 ppm, about 100 ppm, about 110 ppm, about 120 ppm, about 130 ppm, about 140 ppm, about 150 ppm, about 160 ppm, about 170 ppm, about 180 ppm, about 190 ppm, about 200 ppm, about 210 ppm, about 220 ppm, about 230 ppm, about 240 ppm, about 250 ppm, about 260 ppm, about 270 ppm, about 280 ppm, about 290 ppm, about 300 ppm, about 310 ppm, about 320 ppm, about 330 ppm, about 340 ppm, or about 350 ppm acesulfame-K, or any ranges between these values.

In certain embodiments, about 20 ppm of rebaudioside J can be used to modify the sensorial attributes of acesulfame-K in a ready-to-consume food product comprising about 120 ppm, about 180 ppm, or about 300 ppm acesulfame-K. In other embodiments, about 8 ppm of rebaudioside J can be used to modify the sensorial attributes of acesulfame-K in a ready-to-consume food product comprising about 125 ppm acesulfame-K. In other embodiments, about 15 ppm of rebaudioside J can be used to modify the sensorial attributes of acesulfame-K in a ready-to-consume food product comprising about 230 ppm acesulfame-K. In still further embodiments, about 12 ppm of rebaudioside J can be used to modify the sensorial attributes of acesulfame-K in a ready-to-consume food product comprising about 300 ppm acesulfame-K. And in other embodiments, about 25 ppm of rebaudioside J can be used to modify the sensorial attributes of acesulfame-K in a ready-to-consume food product comprising about 300 ppm acesulfame-K.

In still further embodiments, a modifying concentration of rebaudioside J can be used to modify the sensorial attributes of aspartame in a ready-to-consume food product comprising about 50 ppm to about 750 ppm aspartame, about 100 ppm to about 700 ppm aspartame, about 150 ppm to about 650 ppm aspartame, about 150 ppm to about 600 ppm aspartame, about 150 ppm to about 550 ppm aspartame, about 150 ppm to about 500 ppm aspartame, about 150 ppm to about 450 ppm aspartame, about 150 ppm to about 400 ppm aspartame, about 150 ppm to about 350 ppm aspartame, about 150 ppm to about 300 ppm aspartame.

In certain embodiments a modifying concentration of rebaudioside J can be used to modify the sensorial attributes of aspartame in a ready-to-consume food product comprising about 80 ppm, about 90 ppm, about 100 ppm, about 110 ppm, about 120 ppm, about 130 ppm, about 140 ppm, about 150 ppm, about 160 ppm, about 170 ppm, about 180 ppm, about 190 ppm, about 200 ppm, about 210 ppm, about 220 ppm, about 230 ppm, about 240 ppm, about 250 ppm, about 260 ppm, about 270 ppm, about 280 ppm, about 290 ppm, about 300 ppm, about 310 ppm, about 320 ppm, about 330 ppm, about 340 ppm, or about 350 ppm aspartame, or any ranges between these values.

In still further embodiment, about 20 ppm of rebaudioside J can be used to modify the sensorial attributes of aspartame in a ready-to-consume food product comprising about 120 ppm aspartame, about 180 ppm aspartame or about 300 ppm aspartame. In other embodiments, about 8 ppm of rebaudioside J can be used to modify the sensorial attributes of aspartame in a ready-to-consume food product comprising about 125 ppm aspartame. In another embodiment, about 15 ppm of rebaudioside J can be used to modify the sensorial attributes of aspartame in a ready-to-consume food product comprising about 230 ppm aspartame. In yet another embodiment, about 12 ppm of rebaudioside J can be used to modify the sensorial attributes of aspartame in a ready-to-consume food product comprising about 300 ppm aspartame. In a particular embodiment, about 25 ppm of rebaudioside J can be used to modify the sensorial attributes of aspartame in a ready-to-consume food product comprising about 300 ppm aspartame.

In some embodiments, the ready-to-consume food product comprising a sweetener and a modifying concentration of rebaudioside J can be a ready-to-drink beverage product selected from the group consisting of carbonated beverages, non-carbonated beverages, fountain beverages, frozen carbonated beverages, fruit juices, fruit juice-flavored drinks, fruit-flavored drinks, sports drinks, energy drinks, fortified/enhanced water drinks, soy drinks, vegetable drinks, grain-based drinks, malt beverages, fermented drinks, yogurt drinks, kefir, coffee beverages, tea beverages, dairy beverages, and combinations thereof. In some embodiments, the ready-to-drink beverage comprising a sweetener and a modifying concentration of rebaudioside J can be non-carbonated beverage and the sweetener can be a steviol glycoside such as rebaudioside A. In other embodiments, the ready-to-drink beverage comprising a sweetener and a modifying concentration of rebaudioside J can be a carbonated beverage and the sweetener can be a steviol glycoside such as rebaudioside A.

In some embodiments the ready-to-drink beverage product can be a ready-to-drink non-carbonated tea beverage comprising about 180 ppm rebaudioside A and about 20 ppm rebaudioside J. In other embodiments, the ready-to-drink beverage product can be a ready-to-drink carbonated fruit-flavored beverage comprising about 125 ppm rebaudioside A and about 8 ppm rebaudioside J. In yet another embodiment, the ready-to-drink beverage product can be a ready-to-drink carbonated lemon-lime beverage comprising about 235 ppm rebaudioside A and about 15 ppm rebaudioside J. In still other embodiments, the ready-to-drink beverage product can be a ready-to-drink carbonated lemon-lime beverage comprising about 300 ppm rebaudioside A and about 20 ppm rebaudioside J. For each of these embodiments, the rebaudioside A can have a purity ranging from about 80% to about 100%, and in certain embodiments, rebaudioside A can have a purity of about 95%.

Although the concentrations of rebaudioside J described above are typical for ready-to-consume food products, rebaudioside J can also be added, in appropriate amounts, to concentrates or syrups that can be diluted to prepare ready-to-consume products, such as a beverage. For example, and in certain embodiments, a beverage concentrate or syrup can be diluted with water or carbonated water in a 1-plus-5-throw (1 volume of syrup or concentrate plus 5 volumes of water). Thus, assuming a six-fold dilution, rebaudioside J can be present in a beverage syrup or concentrate at a concentration of from about 6 ppm to less than 240 ppm, from about 10 ppm to about 230 ppm, from about 20 ppm to about 220 ppm, from about 30 ppm to about 210 ppm, from about 40 ppm to about 200 ppm, from about 50 ppm to about 180 ppm, from about 60 ppm to about 170 ppm, from about 70 ppm to about 160 ppm, from about 80 to about 150. In particular embodiments, the beverage concentrate or syrup can contain rebaudioside J in a concentration ranging from about 80 ppm to about 150 ppm.

In other embodiments the beverage concentrate or syrup can contain rebaudioside J in a concentration of about 6 ppm, about 12 ppm, 18 ppm, about 24 ppm, about 30 ppm, about 36 ppm, about 42 ppm, about 48 ppm, about 54 ppm, about 60 ppm, about 66 ppm, about 72 ppm, about 78 ppm, about 84 ppm, about 90 ppm, about 96 ppm, about 102 ppm, about 108 ppm, about 114 ppm, about 120 ppm, about 126 ppm, about 132 ppm, about 138 pm, about 144 ppm, about 150 ppm, about 156 ppm, about 162 ppm, about 168 ppm, about 174 ppm, about 180 ppm, about 186 ppm, about 192 ppm, about 198 ppm, about 204 ppm, about 210 ppm, about 216 ppm, about 222 ppm, about 228 ppm, about 234 ppm, less than 240 ppm, or any ranges between any of these values.

In still other embodiments, the beverage concentrate or syrup can contain rebaudioside J in a concentration of about 72 ppm, 90 ppm, about 108 ppm, about 120 ppm, about 132 ppm, or about 146 ppm rebaudioside J.

In addition to rebaudioside J in the varying amounts described above, the beverage concentrate or syrup can also comprise a nutritive or non-nutritive natural or synthetic sweetener, or a combination of such sweeteners. Exemplary sweeteners are as disclosed above.

In certain embodiments the beverage concentrate or syrup can comprise a non-nutritive sweetener and the non-nutritive sweetener, or a combination of such sweeteners, can be present in the beverage concentrate or syrup in a total non-nutritive sweetener concentration ranging from about 300 ppm to about 4500 ppm, from about 600 ppm to about 4200 ppm, from about 900 ppm to about 3900 ppm, from about 900 ppm to about 3600 ppm, from about 900 ppm to about 3300 ppm, from about 900 ppm to about 3000 ppm, from about 900 ppm to about 2700 ppm from about 900 ppm to about 2400 ppm, from about 900 ppm to about 2100 ppm, or from about 900 ppm to about 1800 ppm.

In other embodiments the beverage concentrate or syrup can contain a total non-nutritive sweetener concentration of about 480 ppm, about 540 ppm, about 600 ppm, about 660 ppm, about 720 ppm, about 780 ppm, about 840 ppm, about 900 ppm, about 960 ppm, about 1040 ppm, about 1100 ppm, about 1200 ppm, about 1260 ppm, about 1320 ppm, about 1380 ppm, about 1440 ppm, about 1500 ppm, about 1560 ppm, about 1620 ppm, about 1680 ppm, about 1740 ppm, about 1800 ppm, about 1860 ppm, about 1920 ppm, about 1980 ppm, about 2040 ppm, about 3000 ppm, or about 3060 ppm aspartame, or any ranges between these values. In particular embodiments the non-nutritive sweetener can be present in the beverage concentrate or syrup in a concentration of about 750 ppm. In other embodiments the non-nutritive sweetener can be in the beverage concentrate or syrup in a concentration of about 1080 ppm. In other embodiments the non-nutritive sweetener can be in the beverage concentrate or syrup in a concentration of about 1800 ppm.

Method of Synthesizing Rebaudioside J

High purity rebaudioside J can be chemically synthesized using the illustrative methods disclosed herein. Suitable protecting groups can be employed in the synthesis, if needed. See Wuts, P. G. M.; Greene, T. W., "Greene's Protective Groups in Organic Synthesis", 4th Ed., J. Wiley & Sons, N Y, 2007.

In general, compounds of Formula I can be formed by removing the protecting groups from Formula II. In some embodiments, a method for preparing rebaudioside J can comprise subjecting a compound of Formula II

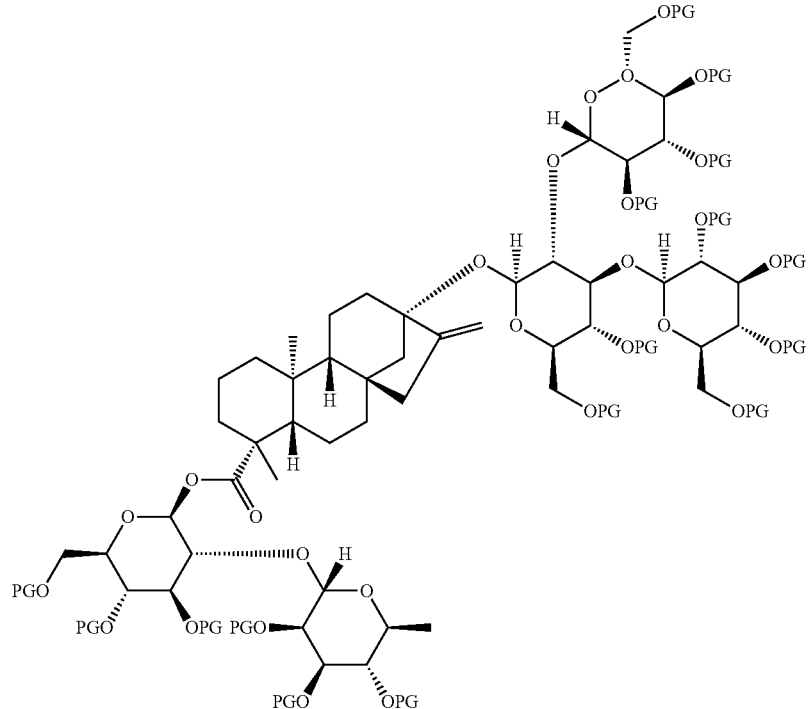

Formula II to deprotection conditions to form rebaudioside J, wherein PG in Formula II is a protecting group.

The protecting group PG can be any protecting group suitable for protecting a hydroxyl group. Such protecting groups are generally known in the art. In some embodiments, the protecting group can be an acyl group, such as an acetyl group, a benzoyl group, and/or a pivaloyl group. In other embodiments, the protecting group can be a suitably substituted silyl group. See Wuts, P. G. M.; Greene, T. W., "Greene's Protective Groups in Organic Synthesis", 4th Ed., J. Wiley & Sons, N Y, 2007.

In some embodiments, the compound of Formula II can be prepared by reacting an activated sugar of Formula III

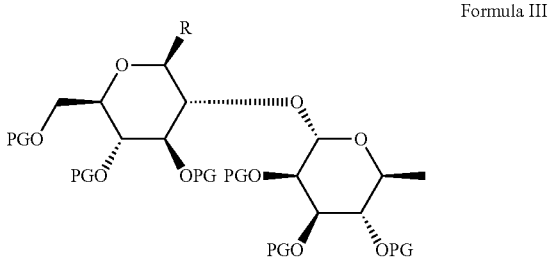

Formula III with a protected rebaudioside B in the presence of a phase transfer catalyst, wherein R in Formula III is a leaving group. In certain embodiments, the leaving group R can be a halogen such as F, Cl, Br, or I. In other embodiments, the leaving group R can be a trichloroacetimidate group.

The coupling of a protected rebaudioside compound with an activated sugar is known in the art. Exemplary procedures are also described in the Examples section.

Activated sugars and protected rebaudioside B can be prepared using methods known in the art. In some embodiments, the protected rebaudioside B can be acetylated rebaudioside B (AcRB). In some embodiments, a phase transfer catalyst can be tetra-n-butylammonium chloride (TBAC), tetra-n-butylammonium bromide (TBAB), or tetra-n-butylammonium iodide (TBAI).

To deprotect the coupling intermediate and generate rebaudioside J, known deprotection methods can be used for the protecting groups used.

EMBODIMENTS

In addition to the various embodiments described above, the present disclosure includes the following specific embodiments numbered E1 through E27. This list of embodiments is presented as an exemplary list and the application is not limited to these embodiments.

E1. Isolated rebaudioside J having a purity greater than about 85 weight percent.

E2. The isolated rebaudioside J of E1, having a purity greater than about 90 weight percent.

E3. The isolated rebaudioside J of E1, having a purity greater than about 95 weight percent.

E4. The isolated rebaudioside J of E1, having a purity greater than about 99 weight percent.

E5. The isolated rebaudioside J of E1, having a purity greater than about 99.9 weight percent.

E6. A sweetener composition comprising rebaudioside J, wherein the rebaudioside J comprises at least 5 weight percent of the sweetener composition.

E7. The sweetener composition of E6, wherein the rebaudioside J comprises at least 50 weight percent of the sweetener composition.

E8. The sweetener composition of E7, wherein the rebaudioside J comprises at least 90 weight percent of the sweetener composition.

E9. The sweetener composition any one of E6-E8, further comprising a non-nutritive sweetener other than rebaudioside J.

E10. The sweetener composition of E9, wherein the non-nutritive sweetener other than rebaudioside J is selected from the group consisting of Lo Han Guo, stevioside, steviolbioside, rubusoside, dulcoside A, rebaudioside A, rebaudioside B, rebaudioside C, rebaudioside D, rebaudioside E, rebaudioside F, rebaudioside G, rebaudioside H, rebaudioside I, rebaudioside K, rebaudioside L, rebaudioside M, rebaudioside O, acesulfame-K, aspartame, neotame, saccharin, sucralose, and combinations thereof.

E11. The sweetener composition of E10, wherein the non-nutritive sweetener is selected from the group consisting of rebaudioside A, rebaudioside B, rebaudioside D, rebaudioside M, and combinations thereof.

E12. The sweetener composition of any one of E6-E8, further comprising at least one component selected from the group consisting of flavoring agents, flowing agents, coloring agents, bulking agents, sugar alcohols, rare sugars, anti-caking agents, functional ingredients, and combinations thereof.

E13. The sweetener composition of any one of E9-E11, further comprising at least one component selected from the group consisting of flavoring agents, flowing agents, coloring agents, bulking agents, sugar alcohols, rare sugars, anti-caking agents, functional ingredients, and combinations thereof.

E14. The sweetener composition of any one of E6-E13, wherein the rebaudioside J is present in an amount effective to provide a sweetness greater than or equal to about 10% sucrose.

E15. A food product comprising a sweetening amount of rebaudioside J and at least one other food ingredient.

E16. The food product of E15, wherein the food product is a noncarbonated beverage, a carbonated beverage, a frozen beverage, or a dairy beverage.

E17. A beverage product comprising: from about 1 ppm to about 10,000 ppm rebaudioside J; and water.

E18. The beverage product of E17, wherein the beverage is a coffee drink, a cola drink, a tea drink, a juice drink, a dairy drink, a sports drink, an energy drink, or a flavored water drink.

E19. The beverage product of E17 or E18, the rebaudioside J is present in an amount greater than taste recognition threshold concentration of rebaudioside J.

E20. The beverage product of any one of E17-E19, wherein the rebaudioside J is present at a concentration of from about 50 ppm to about 750 ppm.

E21. The beverage product of any one of E17-E20, further comprising at least one additional sweetener, wherein the at least one additional sweetener is a nutritive sweetener, non-nutritive sweetener other than rebaudioside J, or a combination thereof.

E22. The beverage product of E21, wherein the at least one additional sweetener is a non-nutritive sweetener and is selected from the group consisting of rebaudioside A, rebaudioside B, rebaudioside D, rebaudioside M, and combinations thereof.

E23. The beverage product of E22, wherein the at least one additional sweetener is rebaudioside B, rebaudioside D, or a combination thereof.

E24. The beverage product of E23, wherein the at least one additional sweetener is rebaudioside D, and the rebaudioside D is present in a concentration of from about 50 ppm to about 750 ppm.

E25. The beverage product of E23, wherein the at least one additional sweetener is rebaudioside B, and the rebaudioside B is present in a concentration of from about 50 ppm to about 750 ppm.

E26. A method for preparing rebaudioside J, the method comprising subjecting a compound of Formula II.

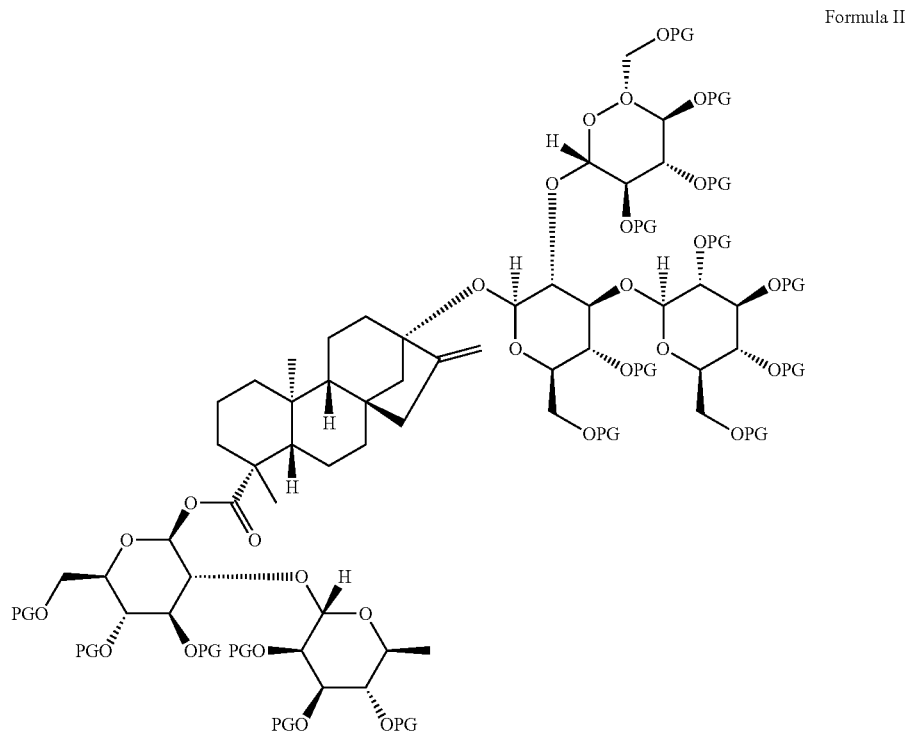

Formula II to deprotection conditions to form rebaudioside J, wherein PG in Formula II is a protecting group.

E27. The method of E26, wherein the compound of Formula II is prepared by reacting a compound of Formula III Formula III with a protected rebaudioside B in the presence of a phase transfer catalyst, wherein R in Formula III is a leaving group.

EXAMPLES

The compositions and beverages described herein are now further detailed with reference to the following examples. These examples are provided for the purpose of illustration only and the embodiments described herein should in no way be construed as being limited to these examples. Rather, the embodiments should be construed to encompass any and all variations which become evident as a result of the teaching provided herein.

Example 1: Synthesis of Disaccharide Intermediate Compound 10

Disaccharide intermediate compound 10 was synthesized using the synthetic method shown in FIG. 1.

Step 1. Preparation of (3R,4R,5S,6S)-6-methyltetrahydro-2H-pyran-2,3,4,5-tetrayl tetraacetate (Compound 2)

To the solution of (2R,3R,4S,5S)-2,3,4,5-tetrahydroxyhexanal (compound 1) (11.20 g, 1.0 eq) and DMAP (1.06 g, 0.13 eq) in pyridine (120 mL) was added acetic anhydride (130.8 g, 19.2 eq) at 0° C. The reaction mixture was then allowed to warm to room temperature and stirred for 10 h. The mixture was concentrated under vacuum to afford a yellow oil. The oil was dissolved in ethyl acetate and the organic layer was washed with 5% citric acid, saturated $NaHCO_3$ aqueous solution and brine and then dried over $Na_2SO_4$. Filtration followed by concentration under reduced pressure gave product compound 2 (16.5 g, 67% yield) as yellow oil which was used in the next step.

$^1$H NMR (400 MHz, $CDCl_3$) δ=6.00 (d, J=1.8 Hz, 1H), 5.28 (s, 1H), 5.26-5.21 (m, 1H), 5.15-5.07 (m, 1H), 3.93 (s, 1H), 2.15 (d, J=4.6 Hz, 6H), 2.05 (s, 3H), 1.99 (s, 3H), 1.23 (d, J=6.4 Hz, 3H).

Step 2. Preparation of (2R,3R,4R,5S,6S)-2-bromo-6-methyltetrahydro-2H-pyran-3,4,5-triyl triacetate (Compound 3)

To a solution of compound 2 (18.0 g, 1.0 eq) in methylene chloride (60 mL) at 19° C. was added dropwise HBr (33% in acetic acid; 53.1 g, 4.0 eq) over a period of 0.5 h and the reaction mixture was stirred at 20° C. for 3 h. The reaction mixture was poured into a mixture of ice-water (200 mL)

and dichloromethane (200 mL). The organic layer was washed with water (150 mL), aqueous NaHCO$_3$ (180 mL) and brine (200 mL) and then dried over anhydrous Na$_2$SO$_4$. Filtration followed by concentration under reduced pressure gave product compound 3 (18.0 g, 85%).

Step 3. Preparation of (2R,3R,4R,5S,6S)-2-hydroxy-6-methyltetrahydro-2H-pyran-3,4,5-triyl triacetate (Compound 4)

To the solution of compound 3 (19.70 g, 1.0 eq) in the mixture of acetone (150 mL) and H$_2$O (6 mL) was added Ag$_2$CO$_3$ (15.38 g, 1.0 eq) portion-wise. The mixture was stirred at 20° C. for 3 h. The mixture was then filtered through a bed of Celite and the filtrate was concentrated under reduced pressure to afford the crude product which was purified by silica gel chromatography (33% ethyl acetate in petroleum ether) to give product compound 4 (11.20 g, 62% yield) as white solid.

$^1$H NMR (400 MHz, CDCl$_3$) δ=5.40-5.34 (m, 1H), 5.27 (br s, 1H), 5.18-5.14 (m, 1H), 5.12-5.04 (m, 1H), 4.12 (br d, J=7.1 Hz, 1H), 3.37-3.23 (m, 1H), 2.15 (s, 3H), 2.06 (s, 3H), 2.01-1.97 (m, 3H), 1.22 (d, J=6.4 Hz, 3H).

Step 4. Preparation of (2R,3R,4R,5S,6S)-2-bromo-6-methyltetrahydro-2H-pyran-3,4,5-triyl triacetate (Compound 5)

CCl$_3$CN (39.8 g, 10.0 eq) was added to the solution of compound 4 (8.0 g, 1.0 eq) and DBU (0.84 g, 0.2 eq) in methylene chloride (150 mL). The reaction mixture was stirred at room temperature for 3 h after which it was filtered and the solvent was evaporated under reduced pressure to afford crude product. The product was isolated by column chromatography (33% ethyl acetate in petroleum ether) to give product compound 5 (6.0 g, 48% yield).

$^1$H NMR (400 MHz, CDCl$_3$) δ=8.74 (s, 1H), 6.21 (d, J=1.8 Hz, 1H), 5.52-5.45 (m, 1H), 5.42-5.32 (m, 1H), 5.19 (s, 1H), 4.19-4.04 (m, 1H), 2.20 (s, 3H), 2.08 (s, 3H), 2.01 (s, 3H), 1.28 (d, J=6.3 Hz, 3H).

Step 5. Synthesis of (2R,4aR,6S,7R,8R,8aR)-8-(benzyloxy)-6-methoxy-2-phenylhexahydropyrano[3,2-d][1,3]dioxin-7-ol (Compound 6)

To benzaldehyde (98.37 g, 6.0 eq) was added ZnCl$_2$ (23.2 g, 1.1 eq) under vigorous stirring. After dissolution of ZnCl$_2$, (2R,3S,4S,5R,6S)-2-(hydroxymethyl)-6-methoxytetrahydro-2H-pyran-3,4,5-triol (compound 12) (30.0 g, 1.0 eq) was added portion-wise. The reaction mixture was stirred for 16 hours at room temperature after which the reaction mixture was diluted with MTBE (30 mL) poured slowly into a stirring in mixture of ice water (300 mL) and hexane (75 mL). After 0.5 h a precipitation resulted. The precipitate was filtered, washed with MTBE (3×100 mL) and dried under vacuum to afford residue. The residue was recrystallized from methylene chloride (150 mL) and washed with the MTBE/methylene chloride solution (3:1, 2×90 mL). The filtrate was recrystallized once more from methylene chloride (150 mL) to give product (2R,4aR,6S,7R,8R,8aS)-6-methoxy-2-phenylhexahydropyrano[3,2-d][1,3]dioxine-7,8-diol (compound 13) (30.0 g, 65% yield, 95% purity) as white crystals.

Compound 13 (25.98 g, 1.0 eq) and benzyl bromide (13.35 g, 1.0 eq) were dissolved in methylene chloride (1.20 L). Sodium hydroxide (6.12 g, 2.0 eq) in H2O (100 mL) was added to the aforementioned mixture and the mixture was stirred at 60° C. for 48 h. The reaction mixture was then cooled and the two layers were separated. The organic layer was washed by water (3×300 mL), brine (400 mL) and then dried over Na2SO4. Solids were removed by filtration and volatiles were removed under reduced pressure to afford a crude solid which was purified by silica gel chromatography (33% ethyl acetate in petroleum ether) to give product compound 6 (3.50 g, 11.1% yield).

$^1$H NMR (400 MHz, CDCl$_3$) δ=7.50 (br d, J=1.5 Hz, 2H), 7.43-7.28 (m, 8H), 5.59 (s, 1H), 4.98 (d, J=11.5 Hz, 1H), 4.85-4.77 (m, 2H), 4.31 (s, 1H), 3.89-3.71 (m, 4H), 3.66 (s, 1H), 3.46 (s, 3H), 2.32 (d, J=7.5 Hz, 1H).

Step 6. Preparation of (2S,3R,4R,5S,6S)-2-(((2R,4aR,6S,7R,8S,8aR)-8-(benzyloxy)-6-methoxy-2-phenylhexahydropyrano[3,2-d][1,3]dioxin-7-yl)oxy)-6-methyltetrahydro-2H-pyran-3,4,5-triyl triacetate (Compound 7)

A solution of compound 5 (6.00 g, 1.2 eq) and compound 6 (4.28 g, 1.0 eq) in methylene chloride (240.00 mL) was cooled to −50° C. after which powdered 4 Å molecular sieves (0.78 g) and TMSOTf (256 mg, 0.10 eq) were added and the reaction mixture was stirred at −50° C. for 2 h. The reaction was quenched with triethylamine (0.50 mL) and the mixture was then filtered and concentrated under vacuum to afford crude product which was purified by column chromatography (33% ethyl acetate in petroleum ether) to give product compound 7 (5.50 g, 67% yield) as white solid.

$^1$H NMR (400 MHz, CDCl$_3$) δ=7.51 (dd, J=2.0, 7.5 Hz, 2H), 7.43-7.28 (m, 8H), 5.61-5.56 (m, 1H), 5.43-5.35 (m, 2H), 5.12-5.05 (m, 1H), 4.98 (d, J=1.5 Hz, 1H), 4.82 (s, 3H), 4.32-4.26 (m, 1H), 4.13 (d, J=7.3 Hz, 1H), 4.02-4.00 (m, 1H), 3.85-3.80 (m, 1H), 3.79-3.75 (m, 1H), 3.71-3.66 (m, 1H), 3.65-3.58 (m, 1H), 3.43 (s, 3H), 2.14 (s, 3H), 2.08 (s, 3H), 2.01 (s, 3H), 1.23 (d, J=6.2 Hz, 3H).

Step 7. Preparation of (2S,3R,4R,5S,6S)-2-(((2S,3R,4S,5S,6R)-4,5-dihydroxy-6-(hydroxymethyl)-2-methoxytetrahydro-2H-pyran-3-yl)oxy)-6-methyltetrahydro-2H-pyran-3,4,5-triyl triacetate (Compound 8)

To a suspension of 10% Pd on carbon (500 mg) in CH$_3$OH (50 mL) was added compound 7 (5.50 g, 1.00 eq) and acetic acid (599.42 mg, 1.17 eq) in a mixture of CH$_3$OH (50.00 mL) and triethylamine (32.0 mL). The mixture was then vigorously stirred under H$_2$ (30 psi) at 15° C. for 36 h. The reaction mixture was filtered through CELITE and volatiles were removed under reduced pressure to afford compound 8 (4.10 g, 88% yield) as a colorless oil which was used for the next step directly.

Step 8. Preparation of (2R,3R,4S,5R,6R)-6-(acetoxymethyl)-3-(((2S,3R,4R,5S,6S)-3,4,5-triacetoxy-6-methyltetrahydro-2H-pyran-2-yl)oxy)tetrahydro-2H-pyran-2,4,5-triyl triacetate (Compound 9)

To the crude compound 8 (4.45 g, 1.00 eq) was added acetic anhydride (131.08 g, 160 eq), acetic acid (36 mL) and H$_2$SO$_4$ (3.21 g, 4 eq) stirred at 20° C. for 12 h. Sodium acetate (13.17 g, 82.0 eq) was added slowly with continued stirring for 15 min. The reaction mixture was filtered and the filtrate was added to a mixture of ice water (80 mL) and chloroform (100 mL). The organic layers were separated and washed three times with water, saturated NaHCO$_3$ solution and brine (80 mL) and then dried over Na$_2$SO$_4$. The solvent was concentrated under vacuum to afford crude product which was purified by flash chromatography (50% ethyl acetate in hexanes) to give product compound 9 (3.4 g, 6.5% yield) as a white solid.

$^1$H NMR (400 MHz, CDCl$_3$) δ=6.33-6.28 (m, 1H), 5.50-5.41 (m, 1H), 5.13 (d, J=3.1 Hz, 1H), 5.08-5.02 (m, 3H), 4.89 (d, J=1.5 Hz, 1H), 4.34-4.27 (m, 1H), 4.07 (s, 2H), 3.96-3.91 (m, 1H), 3.85-3.78 (m, 1H), 2.25 (s, 3H), 2.13 (s, 3H), 2.09 (d, J=4.4 Hz, 6H), 2.05 (s, 3H), 2.04 (s, 3H), 1.99 (s, 3H), 1.19 (d, J=6.2 Hz, 3H).

Step 9. Preparation of (2S,3R,4R,5S,6S)-2-(((2S, 3R,4S,5R,6R)-4,5-diacetoxy-6-(acetoxymethyl)-2-bromotetrahydro-2H-pyran-3-yl)oxy)-6-methyltetrahydro-2H-pyran-3,4,5-triyl triacetate (Compound 10)

HBr (33% in acetic acid; 3.16 g, 8.00 eq) was added dropwise over 0.5 h to a solution of compound 9 (1.00 g, 1.0 eq) in methylene chloride (25 mL) at 20° C. and the reaction mixture was stirred 3 h. The reaction mixture was poured into a mixture of ice-water (30 mL) and methylene chloride (40 mL). The organic layer was washed twice with water, once with aqueous NaHCO$_3$ and once with brine. The organic phase was dried over anhydrous Na$_2$SO$_4$ and filtered. The filtrate was concentrated under vacuum to afford crude product which was purified by column chromatography (33% ethyl acetate in petroleum ether) to give product compound 10 (0.50 g, 46.0% yield) as white solid.

Figure 9:
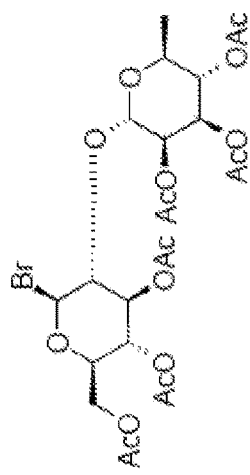
FIG. 9 is a $^1$H NMR spectrum of (2S,3R,4R,5S,6S)-2-(((2S,3R,4S,5R,6R)-4,5-diacetoxy-6-(acetoxymethyl)-2-bromotetrahydro-2H-pyran-3-yl)oxy)-6-methyltetrahydro-2H-pyran-3,4,5-triyl triacetate (Compound 10).
Figure 9:
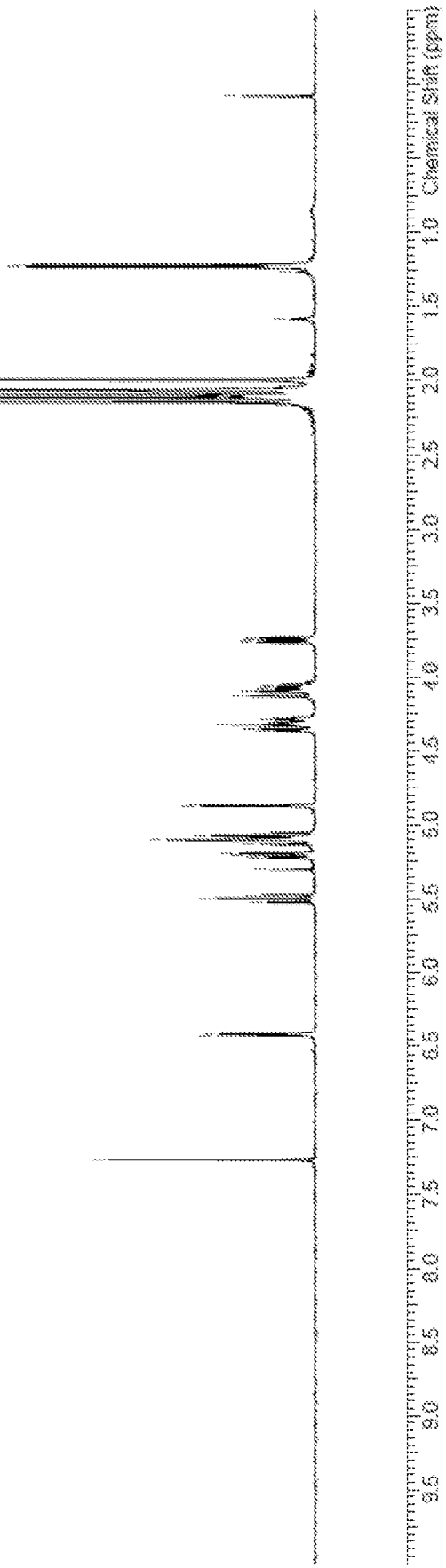

$^1$H NMR (400 MHz, CDCl$_3$) δ=6.42 (d, J=4.0 Hz, 1H), 5.50 (s, 1H), 5.24-5.19 (m, 1H), 5.11 (br d, J=2.0 Hz, 3H), 4.89-4.85 (m, 1H), 4.38-4.27 (m, 2H), 4.15-4.03 (m, 2H), 3.80-3.71 (m, 1H), 2.16-1.98 (m, 18H), 1.22 (d, J=6.2 Hz, 3H). (FIG. 9)

Example 2: Preparation of Rebaudioside J

Figure 2:
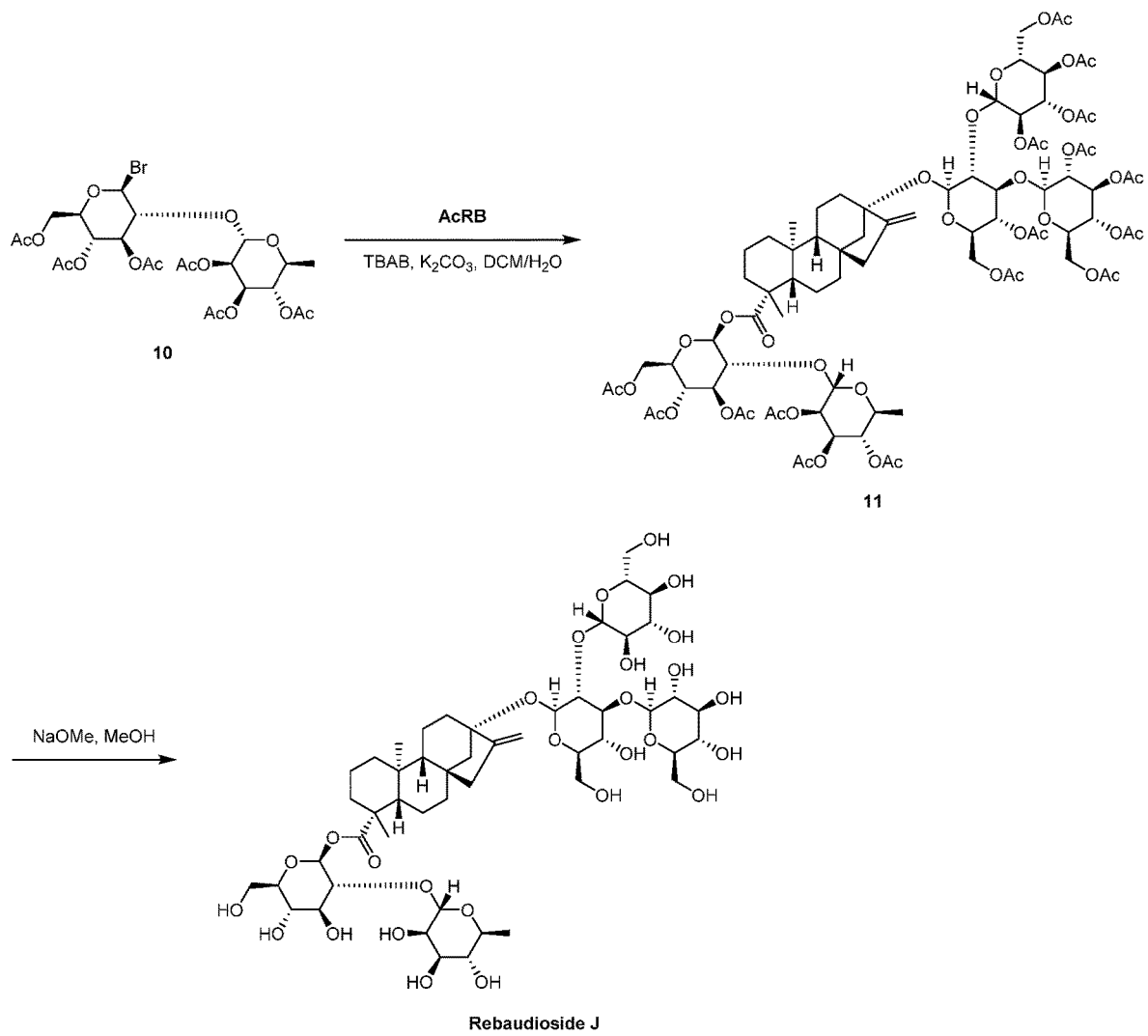
FIG. 2 depicts a synthetic scheme for synthesizing rebaudioside J.

Rebaudioside J was synthesized using the synthetic scheme shown in FIG. 2.

Step 1. Preparation of Peracylated Rebaudioside J (Compound 11)

AcRB (acetylated rebaudioside B) (2.50 g, 1.0 eq) and compound 10 (1.57 g, 1.2 eq) were dissolved in the mixture of methylene chloride (40 mL) and water (40 mL) in the presence of K$_2$CO$_3$ (423 mg, 1.5 eq) and TBAB (658 mg, 1 eq). The reaction mixture was heated to reflux for 4 h, cooled to room temperature and poured into a mixture of ice-water (80 mL) and dichloromethane (150 mL). The organic layer was separated and washed three times with water, once with brine and then dried over anhydrous Na$_2$SO$_4$. After filtration, the filtrate was concentrated to afford crude product from which compound 11 (1.80 g, 44% yield) was purified by column chromatography (50% ethyl acetate in petroleum ether) as white solid.

Figure 10:
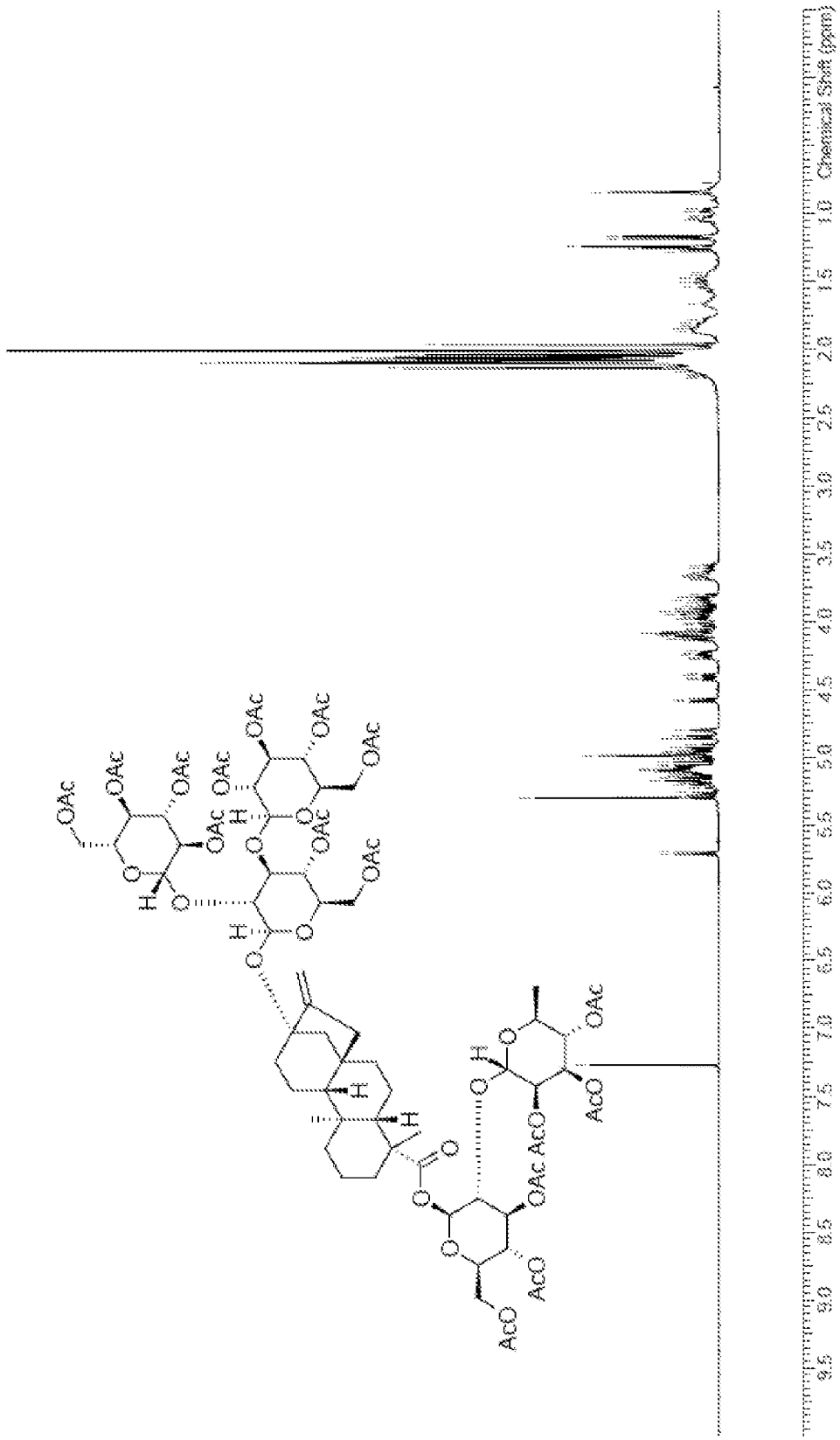
FIG. 10 is a $^1$H NMR spectrum of peracylated rebaudioside J (Compound 11).

$^1$H NMR (400 MHz, CDCl$_3$) δ=5.74-5.68 (m, 1H), 5.30 (s, 1H), 5.29-5.26 (m, 1H), 5.21-5.17 (m, 2H), 5.16-5.14 (m, 1H), 5.14-5.06 (m, 5H), 5.04-5.01 (m, 1H), 5.00-4.98 (m, 2H), 4.98-4.95 (m, 1H), 4.95-4.90 (m, 1H), 4.86 (s, 1H), 4.82-4.79 (m, 1H), 4.61-4.56 (m, 1H), 4.44-4.38 (m, 1H), 4.29-4.21 (m, 2H), 4.16-4.12 (m, 1H), 4.12-4.08 (m, 3H), 4.07-4.01 (m, 1H), 4.00-3.78 (m, 5H), 3.70-3.56 (m, 3H), 2.23-2.15 (m, 3H), 2.14-1.96 (m, 48H), 1.94-1.75 (m, 6H), 1.73-1.57 (m, 3H), 1.57-1.37 (m, 5H), 1.28-1.25 (m, 1H), 1.24 (s, 3H), 1.17 (d, J=6.2 Hz, 3H), 1.11-0.94 (m, 3H), 0.84 (s, 3H), 0.82-0.72 (m, 1H). (FIG. 10)

Step 2. Deprotection of Intermediate Compound 11

To a solution of compound 11 (1.20 g, 1.0 eq) in CH$_3$OH (12.50 mL) was added NaOCH$_3$ (18.2 mg, 0.50 eq). The reaction mixture was stirred at 20° C. for 3 h. 1 M aqueous HCl was then added dropwise to pH=5. Solids were then removed by filtration and the cake was washed twice with by CH$_3$OH and then dried under reduced pressure to afford white solid (650 mg). The solid was suspended in EtOH (5 mL) and the solid collected by filtration and washed twice with ethanol. The solid was freeze-dried in water and lyophilized to give rebaudioside J (505 mg, 65% yield) as white solid.

Figure 11:
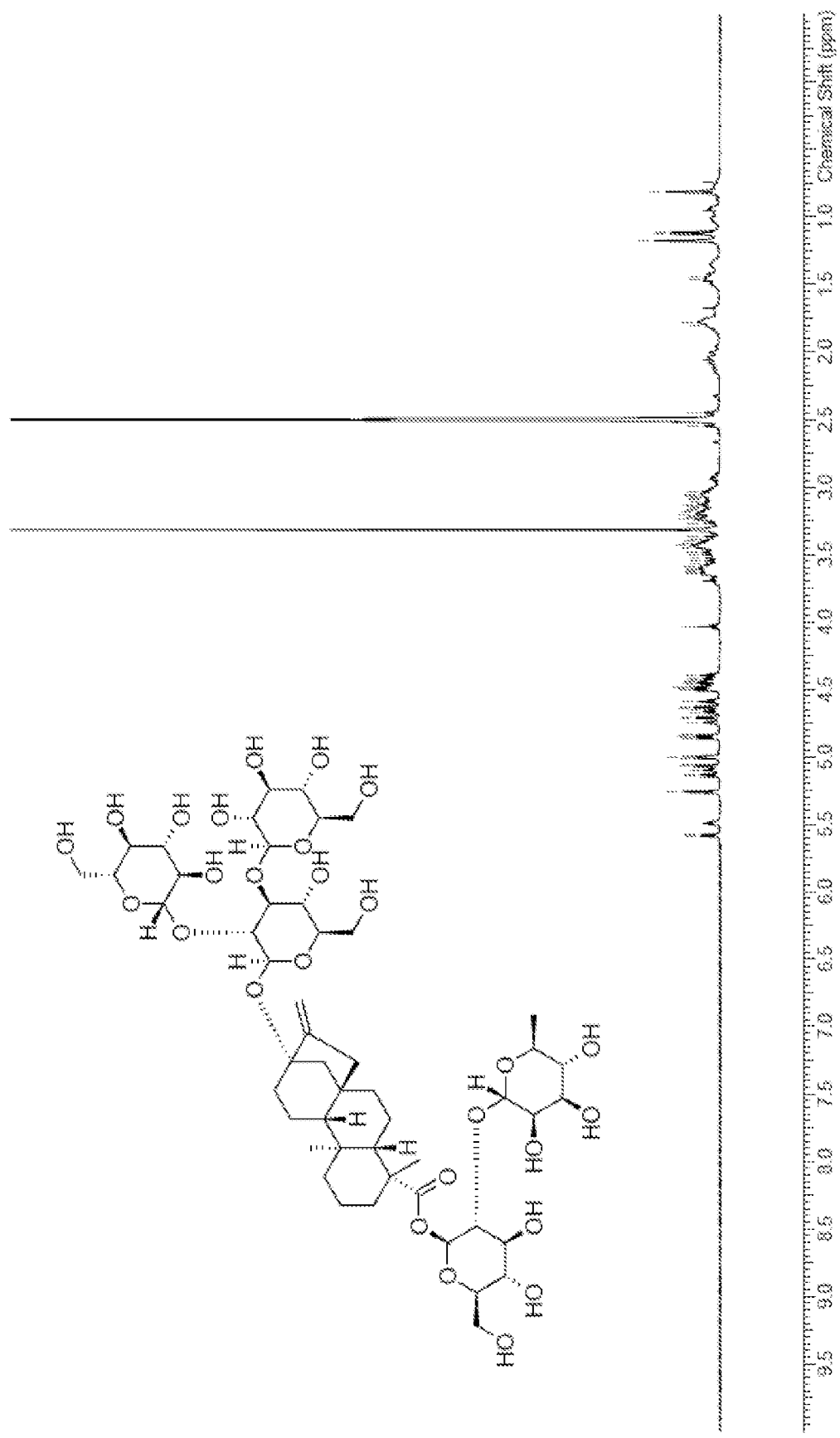
FIG. 11 is a $^1$H NMR spectrum of rebaudioside J.

$^1$H NMR (400 MHz, DMSO-d$_6$) δ=5.60-5.56 (m, 1H), 5.52-5.46 (m, 1H), 5.26 (s, 2H), 5.16-5.04 (m, 3H), 5.00 (s, 2H), 4.85 (s, 2H), 4.77-4.73 (m, 1H), 4.71 (d, J=4.4 Hz, 1H), 4.67 (d, J=7.9 Hz, 1H), 4.63 (d, J=4.4 Hz, 1H), 4.59 (t, J=5.3 Hz, 1H), 4.52-4.38 (m, 6H), 4.07-4.00 (m, 1H), 3.73-3.66 (m, 1H), 3.66-3.56 (m, 5H), 3.56-3.47 (m, 3H), 3.43 (br s, 5H), 3.26-2.99 (m, 14H), 2.98-2.88 (m, 1H), 2.19-1.93 (m, 4H), 1.88-1.74 (m, 4H), 1.73-1.62 (m, 1H), 1.53-1.41 (m, 4H), 1.39-1.29 (m, 2H), 1.17 (s, 3H), 1.12 (d, J=6.2 Hz, 3H), 1.06-0.84 (m, 4H), 0.81 (s, 3H), 0.78-0.71 (m, 1H). (FIG. 11)

Figure 12:
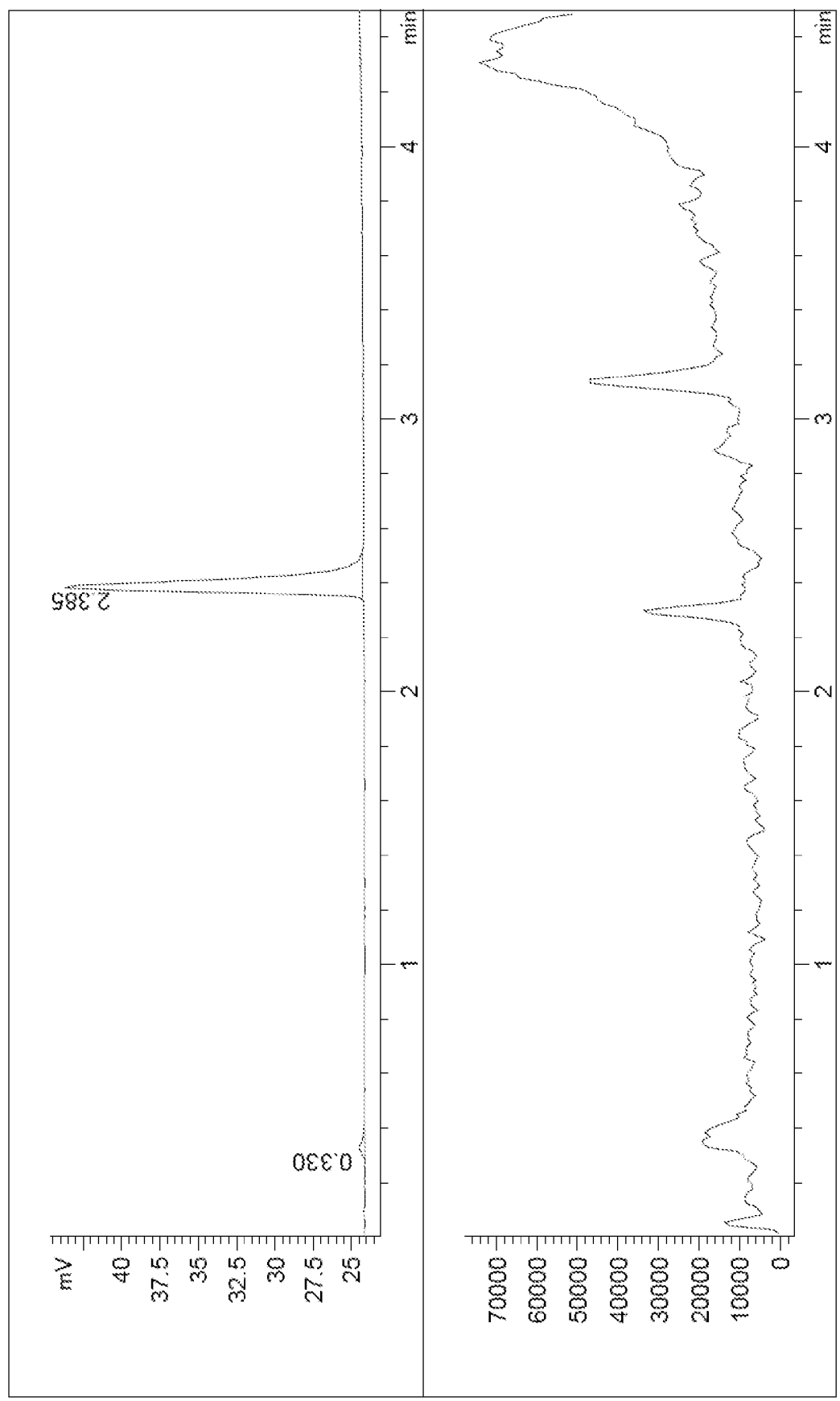
FIG. 12 are LCMS spectra of rebaudioside J.
Figure 13:
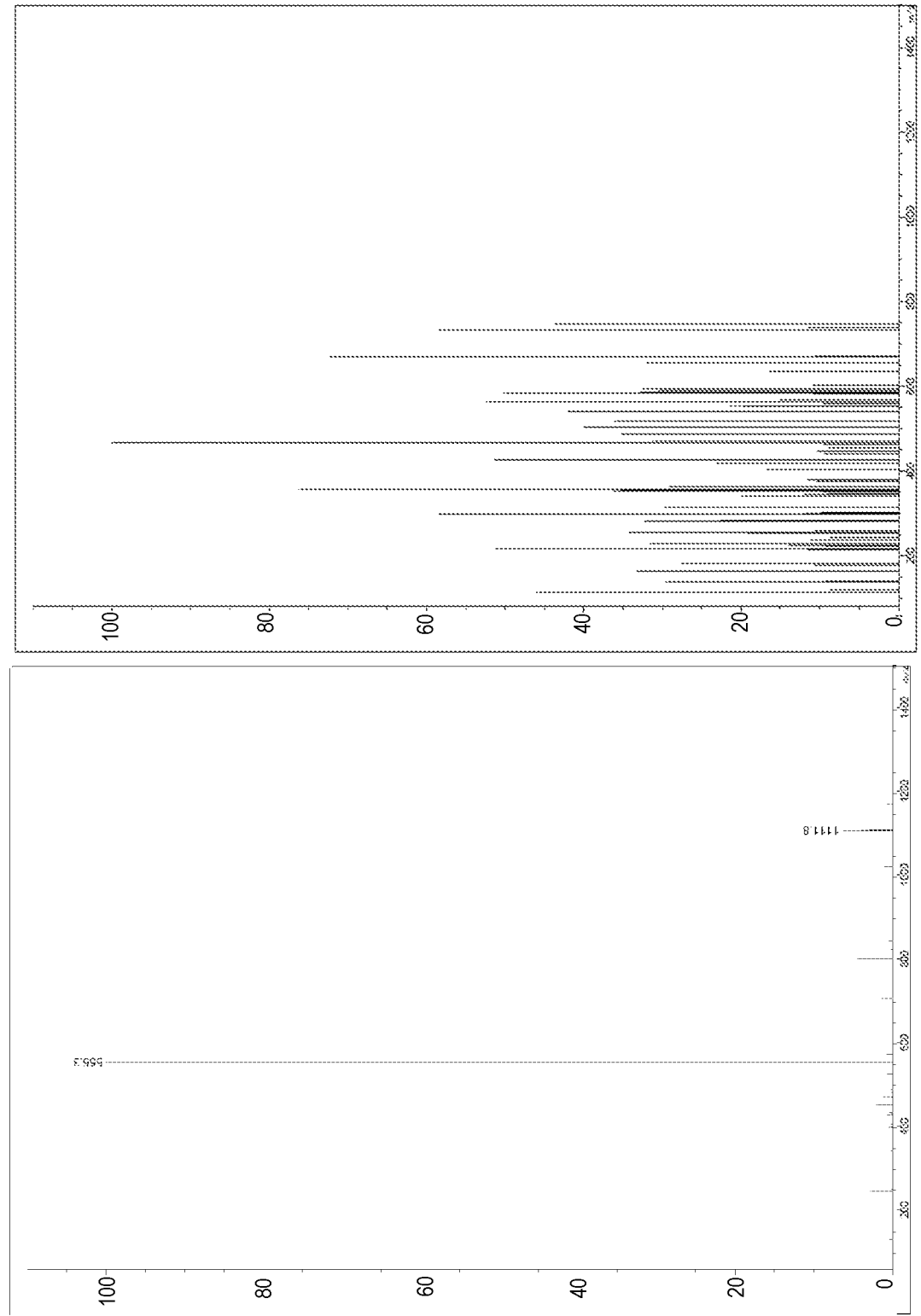
FIG. 13 are mass spectrometry spectra of rebaudioside J.

LCMS (ES-API, Negative Scan) m/z=1111.8 and 555.3; retention time=2.385 minutes. (FIG. 12 and FIG. 13)

Example 3: Sensory Evaluation of Rebaudioside J

General Procedures for Benchtop Testing

Sample preparation: 4 degrees Brix HFCS control solution was prepared by adding 50.89 grams of 78.60 degrees Brix HFCS to 1000 g phosphoric acid base which was prepared by adding phosphoric acid dropwise into 1 L of AQUAFINA water until a pH of 3.1 was observed on a calibrated METTLER TOLEDO pH meter.

For some low soluble compounds, Branson 2800 Ultra Sonic Bath was used to dissolve the material. If any cloudiness persisted, the sample solution was passed through a paper filter. Solubility was confirmed by shining a laser pointer through the solution. If no diffraction was observed then it was assumed that the material was soluble.

Preparation of Rebaudioside A for Sensory Evaluation: 400 ppm rebaudioside A in water (pH=7) was prepared by dissolving 40 mg of rebaudioside A with stirring in 100 mL of water at room temperature.

Preparation of Sucrose for Sensory Evaluation: 6.5% sucrose in water (pH=7) was prepared by adding 6.5 g of sucrose and dissolving it in 93.5 g water (total 100 gr).

Tasting Protocol: Panelists were presented with two numbered samples and asked to note the sweet quality differences between the two samples. Panelists commented on sweetness onset, sweetness linger, overall sugar-like sweetness, and other qualities, such as bitter taste, metallic note, astringency, cooling sensation, any off-notes, and any associated flavors. Panelists were asked to assess sample odor differences and provide any descriptions. Panelists did not eat at least 1 hour before tasting and rinsed with AQUAFINA water at least 5 times between tasting each sample.

Protocol for Identifying Rebaudioside J as a Sweetener

Figure 3:
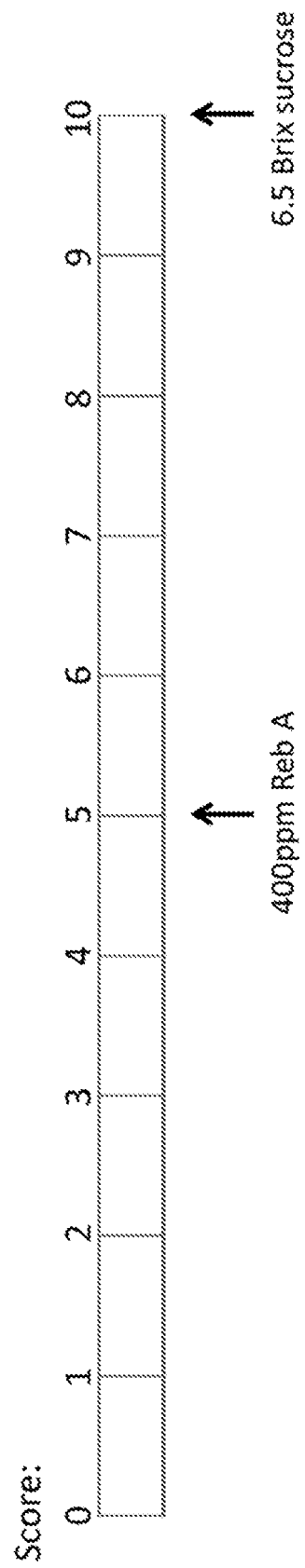
FIG. 3 depicts a scale of 1-10 for comparing the sweetness of different sweeteners.

Panelists wore noseclips and were blinded to the identity of test material. The panelists sampled each of the 400 ppm rebaudioside A and 6.5 degrees Brix sucrose samples prior to the test material. Rebaudioside A 400 ppm was assigned a 5 on the scale as shown in FIG. 3 and sucrose 6.5% was assigned a 10. The panelists were asked to rinse their mouths 5 times between tasting each sample. The panelists were then given the test material and asked to rank the test material for sweetness on a scale of 1-10. The panelists were also asked to provide comments about bitterness, linger, flavors and any other perceptions.

Results: Rebaudioside J (400 ppm) scored 6.7 on the scale as shown in FIG. 3. The panelists also noted a lack of bitterness, sugar-like, syrupy and round characteristics for rebaudioside J.

Example 4: Sensory Testing by Trained Sensory Panelists

Example 4A. Dose Response

Eight concentrations of rebaudioside J with one blank solution were evaluated (Table 1). Trained sensory panelists participated in an orientation session to familiarize themselves with sample set. Three evaluations (replicates) were obtained from each panelist for each evaluation, and a total of 30 judgments were obtained for each sample.

TABLE 1

| Rebaudioside J | | |
|---|---|---|
| Sample | log ((mol/L) * $10^5$) | ppm |
| 1 | N/A | 0.00 |
| 2 | 0.00 | 11.13 |
| 3 | 0.25 | 19.78 |
| 4 | 0.50 | 35.18 |
| 5 | 0.75 | 62.56 |
| 6 | 1.00 | 111.25 |
| 7 | 1.25 | 197.83 |
| 8 | 1.50 | 351.80 |
| 9 | 1.75 | 625.61 |

The panelists were served 10 mL portions of each sample. A 10-minute break was taken between samples. To determine sweetness intensity, the panelists were provided sucrose-containing sweetness intensity reference samples for intensities 5, 8, and 10. For each test sample, the panelists indicated the sweetness intensity of the test sample (labeled with a 3-digit number) on a 15-point line scale.

Figure 4:
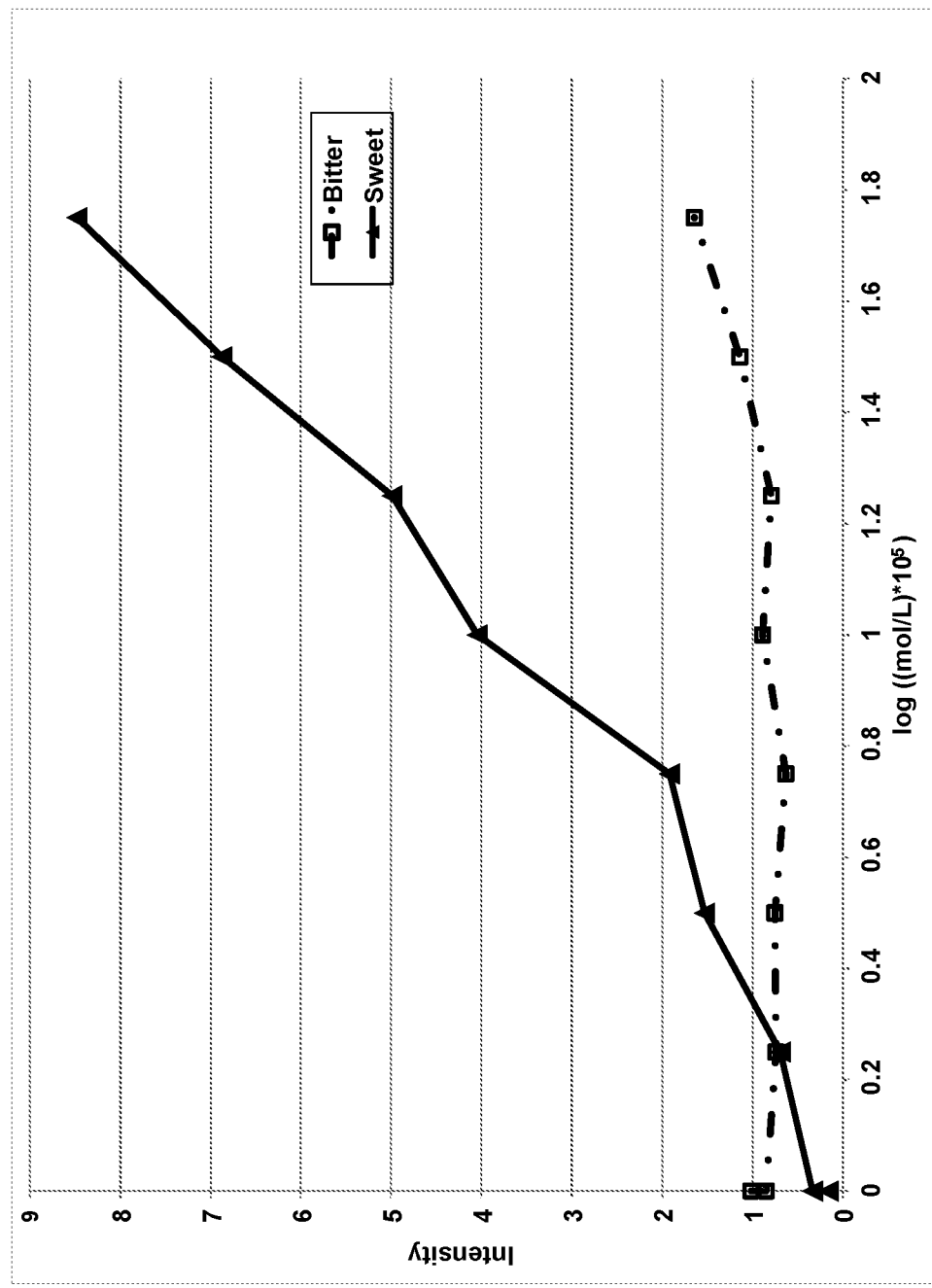
FIG. 4 depicts a graph showing the intensity of bitterness and sweetness of different concentrations of rebaudioside J.

The results in FIG. 4 show that sweetness intensity of rebaudioside J increases with increasing concentration and bitterness intensity was low and only increased slightly with increasing concentration.

Example 4B. Adaptation

Three evaluations (replicates) were obtained from each panelist for each evaluation, and a total of 30 judgments were obtained for each sample. The samples were evaluated for sweetness and bitterness. Samples were presented blind and coded with random three-digit numbers.

Figure 5:
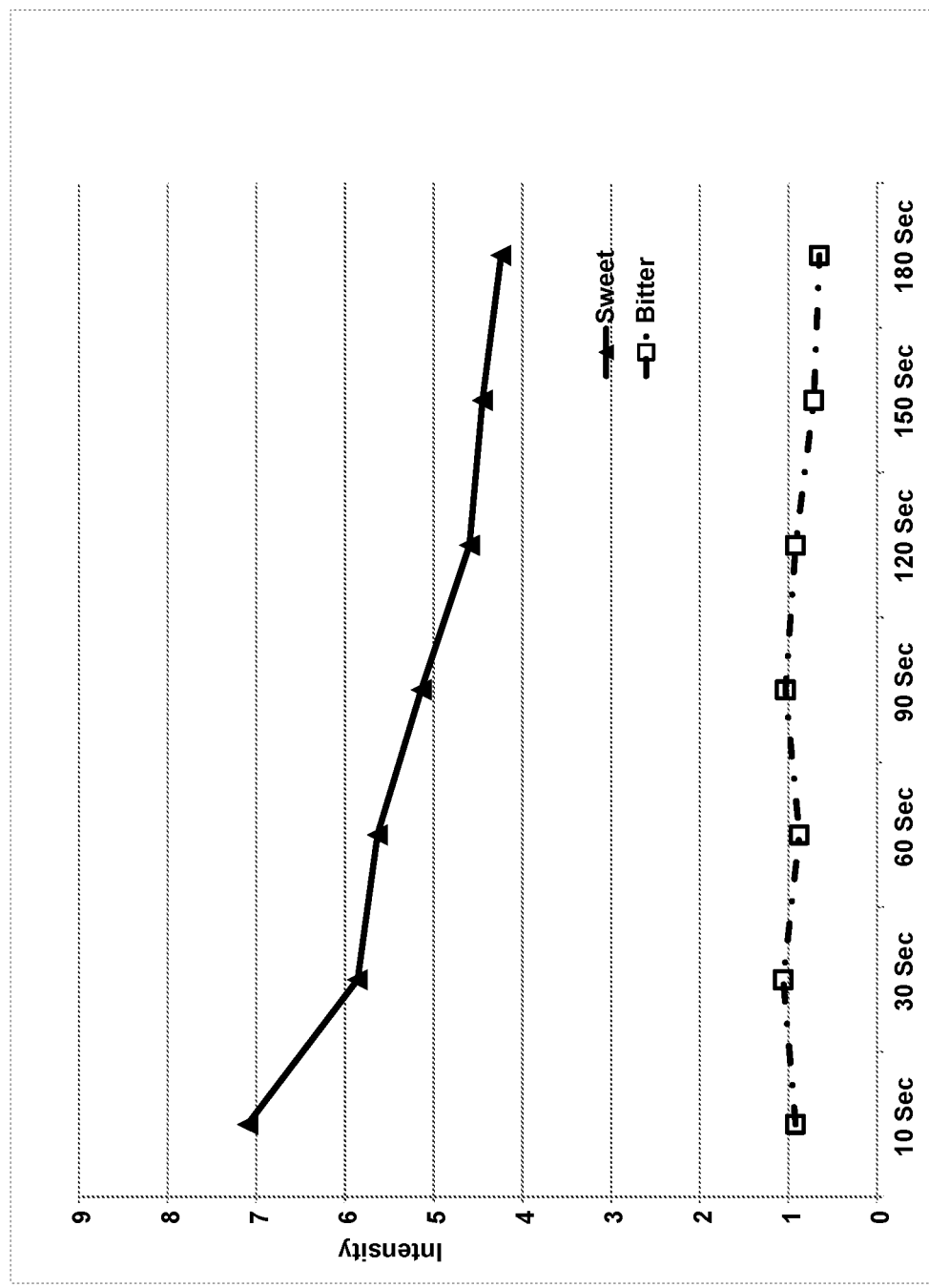
FIG. 5 depicts a graph showing the intensity of lingering bitterness and sweetness of rebaudioside J over time.
Figure 7:
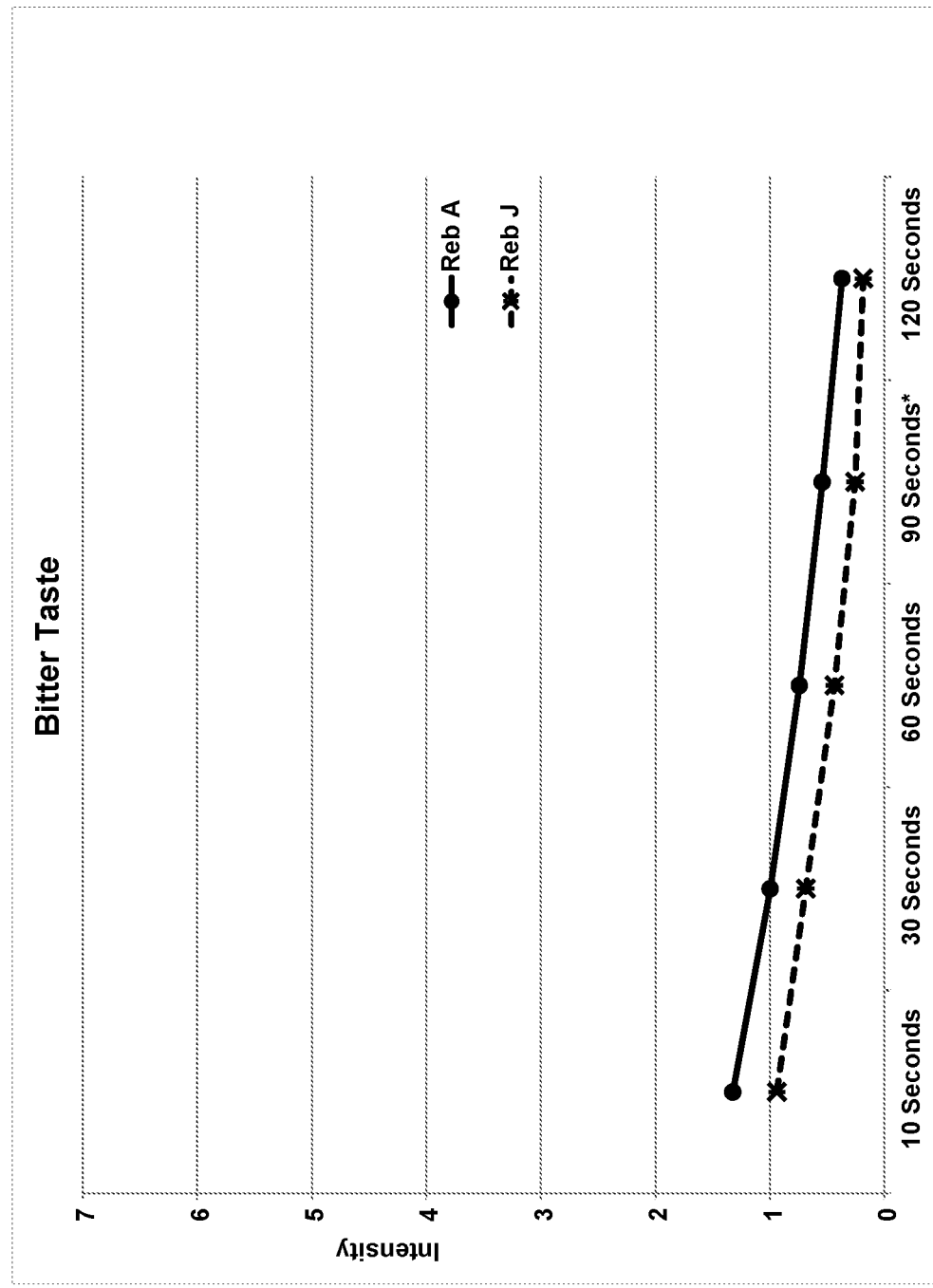
FIG. 7 depicts a comparison of bitterness over time of rebaudioside A and rebaudioside J.

Each panelists took a sip, swirled the sample in his or her mouth for 10 seconds, expectorated and subsequently rated sweetness intensity and bitterness intensity using a 15-point line scale. Panelists repeated this procedure every 30 seconds for 3 minutes. After rinsing 6 times with water, the panelists were given a new sample and that sample was evaluated using the procedure described above The results in FIG. 5 show that rebaudioside J's sweetness intensity decreases over time while its bitterness intensity remains low. As shown in FIG. 7, rebaudioside J was less bitter than rebaudioside A.

Example 4C. Targeted Descriptive Analysis

Panelists participated in an orientation session to familiarize themselves with sample set. They reviewed aroma, taste, flavor, and texture to determine the attributes most important for describing and differentiating the samples. These attributes were used to develop the ballot for the test evaluations. Three evaluations (replicates) were obtained from each panelist for each evaluation, and a total of 30 judgments were obtained for each sample. 45 mL of each sample was served in a sequential monadic presentation. The serving order was balanced for each panelist. For each test sample, the panelists indicated the intensity of each sensory attribute (labeled with a 3-digit number) on a 15-point line scale.

Figure 6:
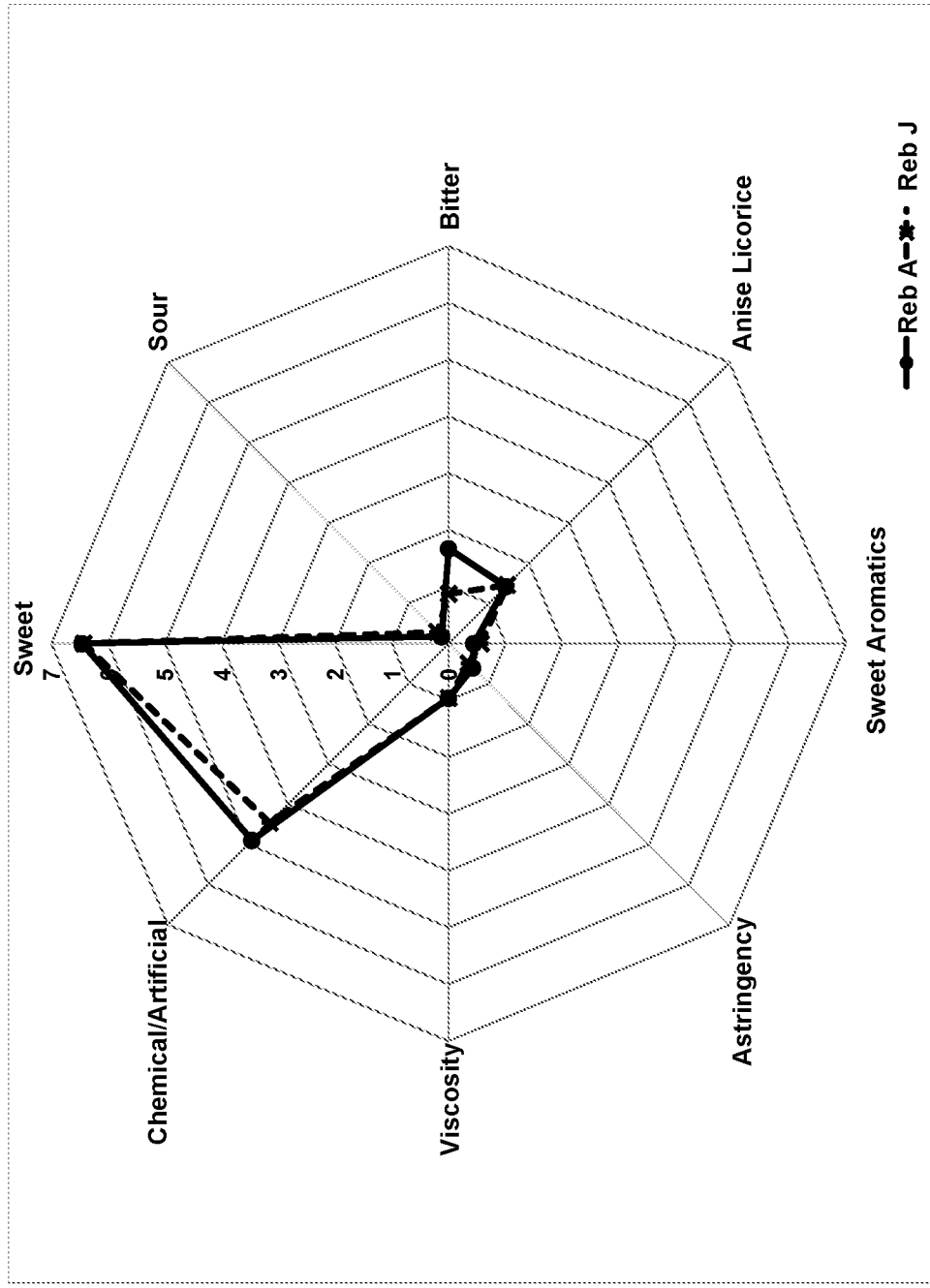
FIG. 6 depicts a comparison of taste and mouthfeel properties of rebaudioside A and rebaudioside J.
Figure 8:
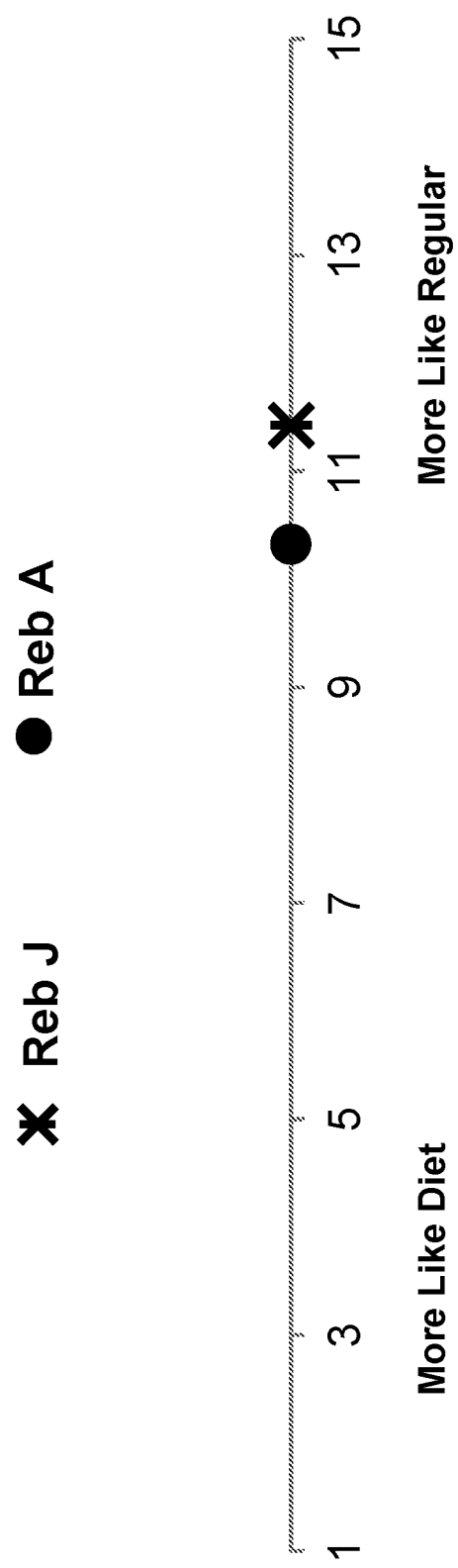
FIG. 8 depicts a graph comparing the overall impression of rebaudioside A compared to rebaudioside J.

As shown in FIG. 6, rebaudioside J was less bitter and exhibited less chemical/artificial taste than rebaudioside A. As shown in FIG. 8, rebaudioside J scored higher in overall impression than rebaudioside A. That is, rebaudioside J was considered more like sugar-like ("regular") as compared to rebaudioside A.

Example 5: Evaluation of Rebaudioside J in Binary and Ternary Sweetener Blends

Rebaudioside J was evaluated in binary and ternary sweetener blends by untrained panelists. In a blinded, forced-choice test, a significant majority (eleven) of fifteen panelists reported that a mixture of 250 ppm rebaudioside J and 50 ppm of rebaudioside D was sweeter than 250 ppm rebaudioside A and 50 ppm of rebaudioside D.

In a second blinded, forced-choice test, a significant majority (ten) of sixteen panelists reported that a mixture of 250 ppm rebaudioside J and 50 ppm of rebaudioside B was sweeter than 250 ppm rebaudioside A and 50 ppm of rebaudioside B.

In a third blinded, forced-choice test, panelists reported that a mixture of 210 ppm rebaudioside J, 60 ppm of rebaudioside B, and 30 ppm of rebaudioside D was equally sweet with a mixture of 210 ppm rebaudioside A, 60 ppm of rebaudioside B, and 30 ppm of rebaudioside D. Despite being equally sweet, the rebaudioside J, B, and D blend was described as "more sugar-like" and "less numbing" than the rebaudioside A/B/D blend.

Example 6: Rebaudioside J as a Sweetness Modifier

Example 6A. Natural and Artificial Sweeteners

The ability of rebaudioside J to modify the sweetness of natural and artificial sweeteners was assessed by comparing the sweetness of control samples without rebaudioside J to the sweetness of samples containing a mixture of the natural or artificial sweetener being tested and rebaudioside J.

Control solutions were prepared by dissolving sucrose, HFCS, acesulfame-K, aspartame, and sucralose in pH 3.1 phosphate buffer. The buffer was prepared by adding concentrated phosphoric acid to one liter of AQUAFINA water until a pH of 3.1 was achieved as measured using a calibrated Mettler Toledo pH meter (about 0.125 g of 85% phosphoric acid per liter).

Sucrose and high fructose corn syrup (HFCS) were prepared as 5 degrees Brix solutions. This concentration was confirmed with an Anton Paar refractometer. Acesulfame-K (250 ppm), aspartame (250 ppm), and sucralose (87.5 ppm)

were prepared to provide solutions having a sweetness of about 5% sucrose equivalent value (SEV).

Experimental samples were identical to control samples except for the addition of 30 ppm rebaudioside J.

Tasting Protocol: The number of sensory panelists ranged from 13 to 16 for all sweeteners tested. Panelists were provided with a control sample prepared as described above. Panelists were also provided with an otherwise identical experimental sample prepared as described above. Panelists were asked to determine which sample tasted sweeter. Panelists did not eat at least 1 hour before tasting and rinsed their mouths with AQUAFINA water at least 5 times between tasting each sample. Panelists wore nose clips and were blinded to the identity of the samples.

Sensitivity index, also referred to as a "d' score" was calculated using known statistical methods. The data shown in Table 2 clearly demonstrated rebaudioside J functioned as a sweetness modifier based on d' scores and the percent of panelists stating that rebaudioside J increased sample sweetness.

TABLE 2

| Sweetener | d' Score | Panelist reporting Rebaudioside J increased sweetness (%) |
|---|---|---|
| Sucralose | 2.44 | 89 |
| Acesulfame potassium | 2.30 | 85 |
| Aspartame | 2.13 | 86 |
| Sucrose | 2.00 | 85 |
| High fructose corn syrup | 1.00 | 69 |

Example 6B. Mogroside V (95%)

A control sample containing Mogroside V was compared to an experimental sample containing a mixture of rebaudioside J and mogroside V to assess differences in sensorial attributes and sweetness. The mogroside V control sample and the mogroside V/rebaudioside J experimental sample were prepared in pH 3.1 phosphate buffer containing about 0.125 ppm 85% phosphoric acid in AQUAFINA water. The control sample contained 140 ppm mogroside V and the experimental sample contained 120 ppm mogroside V and 20 ppm rebaudioside J.

Tasting Protocol: A group of seven untrained panelists rated the samples on sweetness intensity, flavor profile, aftertaste, overall quality, using a 0 to 3 scale with ratings defined as: 0 being the same, 1 being slightly different, 2 being moderately different and 3 being very different. Panelists were also asked to describe aftertaste and off-notes (if present), to indicate which sample was preferred, and to provide comments describing why the sample was preferred. All samples were randomly coded and presented blind to the panelists in 40 mL volumes.

The experimental sample containing rebaudioside J and mogroside V was preferred by 57% of the panelists. A majority of the panelists indicated that the experimental sample was directionally sweeter than the control (71%) and that the experimental sample's overall quality attributes were improved (57%). Panelist comments relating to aftertaste included: less bitter, less lingering sweetness, and increased initial and middle sweet of the temporal profile. These data indicated that rebaudioside J, when used at sub-threshold sweetness concentrations in conjunction with mogroside V, had the ability to increase mogroside V sweetness and positively modify sensorial attributes of mogroside V.

Example 7: Rebaudioside J as a Sensorial Attribute Modifier

Example 7A. Complex Stevia Glycoside Mixtures

An experimental sample containing a mixture of rebaudioside J and SG95 (PureCircle) was compared to a control sample containing SG95 alone. SG95 is a mixture of steviol glycosides with a total steviol glycoside concentration of 95%. It has a lower quality sweetness profile than 95% pure rebaudioside A.

All samples were prepared in pH 3 citric acid buffer containing 0.283 ppm citric acid and 0.04 ppm tri-sodium citrate in AQUAFINA water. The control sample contained 200 ppm SG95 and the experimental sample contained 181 ppm SG95 and 19 ppm rebaudioside J. The samples were evaluated according to the tasting protocol described in Example 6B using six untrained panelists.

The experimental sample containing SG95 and rebaudioside J was preferred by 66% of the panelists. A majority of the panelists (66%) also rated the experimental sample better than the control for aftertaste attributes. Panelist comments relating to aftertaste included: less bitter, less lingering sweetness, and increased mouthfeel. These data indicated that rebaudioside J, when used at sub-threshold sweetness concentrations in combination with SG95, had the ability to positively modify sensorial attributes of SG95.

Example 7B. Tea Beverage Sweetened with Rebaudioside A

Reduced-calorie (5% sucrose), non-carbonated tea prototype beverages (10.6% SEV) comprising 95% pure rebaudioside A (200 ppm) (the "control beverage") or 95% pure rebaudioside A (180 ppm) and rebaudioside J (20 ppm) (the "experimental beverage") were prepared according to the formula provided in Table 3. The samples were evaluated according to the tasting protocol described in Example 6B using eight untrained panelists.

The experimental beverage was preferred by 63% of the panelists. A majority of the panelists also rated the experimental beverage better than the control for aftertaste attributes (75%) and overall quality attributes (63%). Panelist comments relating to aftertaste of the experimental beverage included: less astringent, less lingering sweetness, and less bitterness. These data indicated rebaudioside J, when used at sub-threshold sweetness concentrations in combination with rebaudioside A, had the ability to positively modify sensorial attributes of rebaudioside A in a non-carbonated, reduced-calorie tea beverage.

TABLE 3

Tea Beverage Formulas

| Ingredient | Control Beverage Weight (g) | Experimental Beverage Weight (g) |
|---|---|---|
| Sucrose | 50.00 | 50.00 |
| Sodium Benzoate | 0.24 | 0.24 |
| Potassium Sorbate | 0.13 | 0.13 |
| Sodium hexametaphosphate | 0.65 | 0.65 |
| Ca Na$_2$ EDTA | 0.03 | 0.03 |
| Citric Acid Anhydrous | 1.46 | 1.46 |
| Sweetener (Reb A95) | 0.200 | 0.180 |
| Modifier (Reb J) | 0.000 | 0.020 |
| Tea Powder | 0.80 | 0.80 |
| Antifoam | 0.28 | 0.28 |
| Color Component | 0.30 | 0.30 |

TABLE 3-continued

Tea Beverage Formulas

| Ingredient | Control Beverage Weight (g) | Experimental Beverage Weight (g) |
| --- | --- | --- |
| Tea Acidulant | 0.51 | 0.51 |
| Lemon Flavor | 0.49 | 0.49 |
| AQUAFINA water | QSP 1 L | QSP 1 L |

Example 7C. Rebaudioside J as a Sweetener

Reduced-calorie (5% sucrose), non-carbonated tea prototype beverages (9% SEV) containing 95% pure rebaudioside A (122 ppm) (the "control beverage") or rebaudioside J (122 ppm) (the "experimental beverage") were prepared according to the formula provided in Table 4. The samples were evaluated according to the tasting protocol described in Example 6B The experimental beverage containing rebaudioside J was preferred by 71% of the panelists. The majority of the panelists also rated the experimental beverage better than the control for aftertaste attributes (57%) and overall quality attributes (71%). Panelist comments relating to aftertaste included: slightly syrupy (indicating increased mouthfeel), and slightly less bitter and less astringent. These data indicated that rebaudioside J provided a better sweet quality than rebaudioside A in a non-carbonated, reduced-calorie tea beverage.

TABLE 4

Tea Experimental Prototype Beverage Formula

| Ingredient | Weight (g) |
| --- | --- |
| Sucrose | 50.00 |
| Sodium Benzoate | 0.24 |
| Potassium Sorbate | 0.13 |
| Sodium hexametaphosphate | 0.65 |
| Ca Na$_2$ EDTA | 0.03 |
| Citric Acid Anhydrous | 1.46 |
| Modifier (Reb A95 or Reb J) | 0.122 |
| Tea Powder | 0.080 |
| Antifoam | 0.28 |
| Color Component | 0.30 |
| Tea Acidulant | 0.51 |
| Lemon Flavor | 0.49 |
| AQUAFINA water | QSP 1 L |

Example 7D. Beverage Containing 5% Fruit Juice and Rebaudioside A

Reduced-calorie (4.4 degrees Brix), carbonated (2.4% CO$_2$ by volume), fruit-flavored prototype beverages (8.7% SEV) containing 95% pure rebaudioside A (134 ppm) (the "control beverage") or 95% pure rebaudioside A (126 ppm) and rebaudioside J (8 ppm) (the "experimental beverage") were prepared according to the formula provided in Table 5. The beverages were evaluated according to the tasting protocol described in Example 6B using twelve untrained panelists.

The experimental beverage containing rebaudioside J was preferred by 67% of the panelists. A majority of the panelists also rated the experimental beverage better than the control for overall quality attributes (58%). Panelist comments relating to aftertaste included: less bitter, less sweet linger, more mouthfeel, and more fruit flavor. These data indicated rebaudioside J, when used at sub-threshold sweetness concentrations in combination with rebaudioside A, had the ability to positively modify sensorial attributes of rebaudioside A in moderately carbonated, fruit-flavored beverages.

TABLE 5

Moderately Carbonated Fruit Juice Prototype Beverage Formulas

| Ingredient | Control Beverage Weight (g) | Experimental Beverage Weight (g) |
| --- | --- | --- |
| Sucrose | 32.32 | 32.32 |
| Potassium Sorbate | 0.31 | 0.31 |
| Sodium hexametaphosphate | 0.70 | 0.70 |
| Citric Acid Anhydrous | 1.66 | 1.66 |
| Ascorbic Acid | 0.10 | 0.10 |
| Sweetener (Reb A) | 0.134 | 0.126 |
| Modifier (Reb J) | 0.000 | 0.008 |
| Beta Carotene 1% Powder | 1.00 | 1.00 |
| Juice Concentrate Blend (49.2% solids) | 17.00 | 17.00 |
| Cloud Component | 2.33 | 2.33 |
| Flavor blend | 0.31 | 0.31 |
| Fruit Flavor | 0.76 | 0.76 |
| AQUAFINA water | QSP 1 L | QSP 1 L |

Example 7E. Lemon-lime Prototype Beverage Sweetened with Rebaudioside A

Reduced-calorie (5% sucrose), carbonated (3.4% CO$_2$ by volume) lemon-lime prototype beverages (11.3% SEV) containing 95% pure rebaudioside A (250 ppm) (the "control beverage") or 95% pure rebaudioside A (235 ppm) and rebaudioside J (15 ppm) (the "experimental beverage") were prepared according to the formula provided in Table 6. The beverages were evaluated according to the tasting protocol described in Example 6B.

Surprisingly, the experimental beverage containing a combination of rebaudiosides A and J was preferred by 100% of the panelists. All of the panelists (100%) rated the experimental sample better than the control for aftertaste attributes and overall quality attributes. Panelist comments relating to aftertaste included: less astringent, less lingering sweetness and less bitter. Four panelists specifically commented that the experimental beverage had less lingering sweetness, and three panelists specifically commented that the experimental beverage was less bitter.

These data indicated that rebaudioside J, when used at sub-threshold sweetness concentrations in combination with rebaudioside A, had the ability to positively modify sensorial attributes of rebaudioside A in a carbonated, reduced-calorie lemon-lime beverages.

TABLE 6

Lemon-Lime Prototype Beverage Formulas

| Ingredient | Control Beverage Weight (g) | Experimental Beverage Weight (g) |
| --- | --- | --- |
| Sucrose | 50.00 | 50.00 |
| Potassium Sorbate | 0.10 | 0.10 |
| Ca Na2 EDTA | 0.03 | 0.03 |
| Potassium Citrate | 0.40 | 0.40 |
| Citric Acid Anhydrous | 1.41 | 1.41 |
| Sweetener (Reb A95) | 0.250 | 0.235 |
| Modifier (Reb J) | 0.000 | 0.015 |
| Lemon-Lime Flavor | 1.48 | 1.48 |
| Secondary Flavor | 0.27 | 0.27 |
| AQUAFINA water | QSP 1 L | QSP 1 L |

Example 7F. Lemon-lime Prototype Beverage Sweetened with Rebaudioside A

Reduced-calorie (3.5% sucrose), carbonated (3.4% $CO_2$ by volume) lemon-lime prototype beverages (10.8% SEV) containing 95% pure rebaudioside A (321 ppm) (the "control beverage") or 95% pure rebaudioside A (301 ppm) and rebaudioside J (20 ppm) (the "experimental beverage") were prepared according to the formula provided in Table 7. The beverages were evaluated according to the tasting protocol described in Example 6B using thirteen untrained panelists.

The experimental beverage containing a combination of rebaudiosides A and J was preferred by 92% of the panelists for aftertaste and 77% of the panelists for overall quality. Three panelists specifically commented that the experimental beverage had less lingering sweetness, two panelists specifically commented that the experimental beverage was less bitter, and two panelists specifically stated that the experimental beverage had a cleaner aftertaste. General subjective comments included best finish, more sucrose like, and rounder sweet than reference.

These data indicated that rebaudioside J, when used at sub-threshold sweetness concentrations in combination with rebaudioside A, had the ability to positively modify sensorial attributes of rebaudioside A in a carbonated, reduced-calorie lemon-lime beverage.

TABLE 7

Lemon-Line Prototype Beverage Formula

| Ingredient | Control Beverage Weight (g) | Experimental Beverage Weight (g) |
|---|---|---|
| Sucrose | 35 | 35 |
| Potassium Sorbate | 0.10 | 0.10 |
| Ca Na2 EDTA | 0.03 | 0.03 |
| Potassium Citrate | 0.40 | 0.40 |
| Citric Acid Anhydrous | 1.41 | 1.41 |
| Sweetener (Reb A95) | 0.321 | 0.301 |
| Modifier (Reb J) | 0.000 | 0.020 |
| Lemon-Lime Flavor | 1.48 | 1.48 |
| Secondary Flavor | 0.27 | 0.27 |
| AQUAFINA water | QSP 1 L | QSP 1 L |

Example 8: Rebaudioside J Modifier Concentrations

Four reduced-calorie (3.5% sucrose), carbonated (3.4% $CO_2$ by volume) lemon-lime beverages (10.8% SEV) containing varying concentrations of 95% pure rebaudioside A and rebaudioside J were prepared according to the formula provided in Tables 8. Steviol glycoside concentrations are set forth in Table 9. The beverages were evaluated according to the tasting protocol described in Example 6B using eight untrained panelists.

TABLE 8

Lemon-Lime Experimental Beverage Formula

| Ingredient | Weight (g) |
|---|---|
| Sucrose | 35 |
| Potassium Sorbate | 0.10 |
| Ca Na$_2$ EDTA | 0.03 |
| Potassium Citrate | 0.40 |
| Citric Acid Anhydrous | 1.41 |
| Reb A/Reb J | See Table 9 |
| Lemon-Lime Flavor | 1.48 |
| Secondary Flavor | 0.27 |
| AQUAFINA water | QSP 1 L |

TABLE 9

| | Rebaudiosides | | |
|---|---|---|---|
| Beverage No. | Reb A (ppm) | Reb J (ppm) | Reb J (% of total stevia glycosides) |
| 1 | 321 | 0 | 0 |
| 2 | 273 | 48 | 15 |
| 3 | 297 | 24 | 7.5 |
| 4 | 303 | 18 | 5.6 |
| 5 | 309 | 12 | 3.7 |

TABLE 10

| | Panelists Preferring Reb J Variant (%) | |
|---|---|---|
| Beverage No. | Aftertaste | Overall Quality |
| 1 | reference | reference |
| 2 | 25 | 50 |
| 3 | 63 | 75 |
| 4 | 100 | 67 |
| 5 | 71 | 71 |

As shown in Table 10, preference scores favored the experimental beverages containing rebaudioside J for all beverages having a rebaudioside concentration below 40 ppm. These data confirmed that rebaudioside J improved the sweet quality of rebaudioside A.

What is claimed is:

1. A beverage comprising: sucrose at a concentration of about 3.5 weight percent; about 300 ppm rebaudioside A; from about 12 ppm to about 24 ppm rebaudioside J; and water.

2. The beverage of claim 1, wherein the beverage is a coffee drink, a cola drink, a tea drink, a juice drink, a dairy drink, a sports drink, an energy drink, or a flavored water drink.

* * * * *